United States Patent
Scott et al.

(10) Patent No.: US 11,144,849 B2
(45) Date of Patent: Oct. 12, 2021

(54) URL-BASED ELECTRONIC TICKET TRANSFER

(71) Applicant: TicketFire, Columbus, OH (US)

(72) Inventors: Dwight Scott, Grove City, OH (US); Ray Shealy, Dublin, OH (US); Alex Husted, Upper Arlington, OH (US); Evan Matuszak, Brecksville, OH (US); Todd W. Armstrong, Lewis Center, OH (US)

(73) Assignee: TicketFire, Columbus, OH (US)

( * ) Notice: Subject to any disclaimer, the term of this patent is extended or adjusted under 35 U.S.C. 154(b) by 751 days.

(21) Appl. No.: 15/648,283

(22) Filed: Jul. 12, 2017

(65) Prior Publication Data

US 2018/0018595 A1    Jan. 18, 2018

Related U.S. Application Data

(60) Provisional application No. 62/361,478, filed on Jul. 12, 2016.

(51) Int. Cl.
*G06Q 10/02* (2012.01)
*G06Q 20/08* (2012.01)
(Continued)

(52) U.S. Cl.
CPC .......... *G06Q 10/02* (2013.01); *G06Q 20/045* (2013.01); *G06Q 20/0457* (2013.01);
(Continued)

(58) Field of Classification Search
CPC .. G06Q 10/02; G06Q 20/045; G06Q 20/0457; G06Q 20/085; G06Q 20/12; G06Q 30/0641
(Continued)

(56) References Cited

U.S. PATENT DOCUMENTS

2010/0113072 A1\* 5/2010 Gibson ............... G06Q 20/045
455/466
2012/0265564 A1† 10/2012 McCarthy
(Continued)

OTHER PUBLICATIONS

Agent System for Online Ticket Resale Published by School of International Business and Area Studies, Pusan University of Foreign Studies (Year: 2008).\*

Primary Examiner — Zeina Elchanti
(74) Attorney, Agent, or Firm — Fish & Richardson P.C.

(57) ABSTRACT

In one implementation, a method includes receiving, at a computing device, a digital photo of a paper ticket; generating an electronic ticket as a digital version of the paper ticket; outputting, in a user interface on the computing device, selectable options related to the electronic ticket; receiving, through the user interface, user input comprising selection of the option to sell the ticket; transmitting, by the computing device, a request to the computer system to host the electronic ticket for sale; receiving, at the computing device, a unique URL that is associated with an internet-accessible resource for purchasing the electronic ticket over the internet; outputting, in the user interface, selectable features to distribute the URL to other computing devices; receiving selection of one or more of the selectable features that correspond to one or more particular distribution channels; transmitting at least the URL along the one or more particular distribution channels.

18 Claims, 38 Drawing Sheets

(51) Int. Cl.
*G06Q 30/06* (2012.01)
*G06Q 20/04* (2012.01)
*G06Q 20/12* (2012.01)

(52) U.S. Cl.
CPC .......... *G06Q 20/085* (2013.01); *G06Q 20/12* (2013.01); *G06Q 30/0641* (2013.01)

(58) Field of Classification Search
USPC ........................................................... 705/5
See application file for complete search history.

(56) References Cited

U.S. PATENT DOCUMENTS

| | | |
|---|---|---|
| 2012/0290336 A1† | 11/2012 | Rosenblatt |
| 2013/0238372 A1† | 9/2013 | Jordan |
| 2014/0100896 A1* | 4/2014 | Du .................. G07B 11/00 705/5 |
| 2015/0134371 A1* | 5/2015 | Shivakumar .......... G06Q 50/01 705/5 |
| 2016/0142382 A1† | 5/2016 | Ziebell |
| 2017/0178034 A1* | 6/2017 | Skeen ................ G06Q 20/384 |

\* cited by examiner
† cited by third party

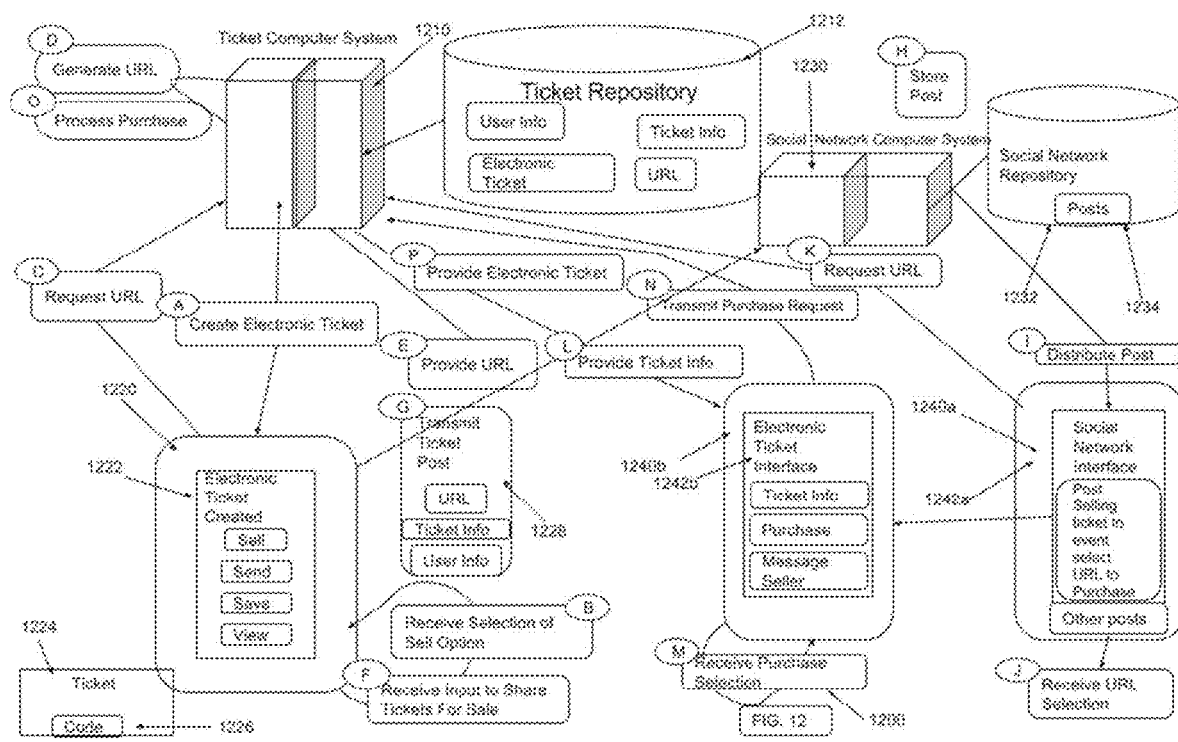

URL-BASED ELECTRONIC TICKET TRANSFER

CROSS-REFERENCE TO RELATED APPLICATIONS

This application claims the benefit of priority to U.S. Provisional Application Ser. No. 62/361,478, entitled URL-BASED ELECTRONIC TICKET TRANSFER and filed on Jul. 12, 2016, the entire contents of which are hereby incorporated by reference.

TECHNICAL FIELD

This document generally describes electronic capture, digitization, mobilization, and transfer of a ticket over a computer network using computing devices, such as mobile computing devices.

BACKGROUND

Tickets for venues, such as recreational or leisure events, tournaments, sporting events, music concerts, art exhibits, theater shows, conventions, exhibitions or any event requiring a ticket for access, are typically sold or issued by the venue hosting the event. Resale of tickets requires that the tickets are somehow transferred from the owner to another person. Transferring tickets to another person is sometimes problematic. Most venues require a physical original ticket or PDF printed ticket. Ticket transfer today is done mostly via email or post.

Problems exist with transferring physical tickets, especially in the final minutes/hours before an event. Transfers may not be secure or easily accomplished. Confirming that a transfer has been made to a third party can be difficult, and fans can become frustrated when tickets are not in their hands as the event nears.

Paper tickets can be lost by the owner or in the mail. Transferring paper tickets at an event is problematic in trying to meet the person in a crowd to exchange tickets with another person across town or on the opposite side of the arena. For season ticket holders, paper tickets must be stored in a secure location that is remembered and easy to access for each event. Transferring paper tickets by mail can incur costly fees. Transferring PDF tickets by email is more efficient, but still requires that the ticket be physically printed. This limits the time window for using the ticket, as it is difficult for most ticket holders to print tickets within the hour(s) before an event begins.

Another problem exists when users attempting to list tickets for sale in other systems receive an error when entering the bar code associated with the ticket. Transferred tickets are sometimes unused because transferees are not properly notified.

Further problems exist with using applications, or apps (software designed to run on a smartphone, tablet, android based device or other mobile device that allow the user to perform tasks). Apps sometimes experience errors, whereby the user is unable to complete the task. In addition, sometimes an app is slow to load or perform the tasks. Venues, where thousands of people using cellular devices can cause dead zones and/or overload data pipelines, are unable to handle high-volume digital traffic. Eliminating the use of an app to access a transferred ticket has a number of advantages including: 1) smaller packet sizes—important since bandwidth is limited at some venues; 2) no need to download the app; and, 3) ease of use.

A need exists for a method to efficiently, conveniently, easily and securely transfer venue tickets in real-time without the need to use an app to access the transferred ticket. A need exists for a system to enhance the confidence level of the validity and accuracy of an electronic image of a paper ticket. A need exists for a system to confirm that the transferee received the ticket. A need exists for a method to eliminate the use of paper tickets by using an easy to use method on a mobile computing device.

SUMMARY

This document generally describes technology for easily and securely transferring a digitalized version of a paper, electronic, PDF or photo of a ticket between parties in real-time, such as through a persistent URL that is associated with a ticket that provides a way for a ticket owner to readily sell and transfer his/her ticket to others. Such technology provides a way for the transfer of tickets where the transferee does not have to access an app to obtain the digital ticket and where the owner receives confirmation of the transfer of the ticket. For example, a ticket owner can digitize and upload a ticket to a computer system that hosts an online ticket purchase and transfer site, and can receive a persistent URL for his/her ticket on the site. The owner can then distribute the URL to others, such as through social media services (e.g., FACEBOOK, TWITTER), online listing services (e.g., CRAIGSLIST), text messages, and email. These other users can follow the URL to a page on the computer system that is specific to the owner's ticket and through which the other users to purchase and obtain the electronic ticket (e.g., download the ticket into an electronic wallet on a mobile computing device, download a pdf of the ticket for printing, transmit the ticket via a message, like a text message or email).

The advantages of this technology over present systems is that it allows ticket owners to transfer tickets easily, conveniently and reliably. A further advantage is that tickets may be transferred to another person the day of the event, minutes before the event, or even after the event has started. Season tickets can be digitized for security and convenience. This technology also allows for the transferring of tickets to another person across town, the opposite side of the venue, or across the globe. This technology also eliminates shipping costs by moving tickets digitally across town or across the world, rather than shipping the physical ticket(s). This technology can also allow for the transfer of a ticket even after the event has begun. This technology can further permit for ticket owners to sell and transfer their tickets to others without needing to go through a ticket exchange, such as STUBHUB, which can charge high fees for ticket sales, can limit the timeframe during which tickets can be sold, may not permit persistent, ticket-specific URLs to be generated and distributed, and may be limited to specific types of tickets. In contrast, the disclosed technology can allow for users to electronically sell a wider range of tickets electronically, to manage and promote the sale of their own tickets through ticket-specific URLs, to sell tickets up to and during the event, and to electronically transfer ownership through a third party (computer system hosting the URL) at a lower cost.

As described in greater detail below, digital versions of a paper tickets can be created. The paper ticket may be a single use, multiple use, season tickets, and the like. In operation, a controller connected to a network, such as the Internet, receives information from a user using a computing device connected to the network. The information is input by the user using the computing device in response to prompts generated by the controller. The information can include an event title, a venue, a date, a section and a seat. The information can further include a photo of the paper ticket and a scan of a barcode of the paper ticket. The photo and the scan are captured by the computing device and uploaded to the controller.

The controller processes the information, photo and scan. In an embodiment, the processing includes using a unique optical character recognition (OCR) technology to create a result for each of the title of the event, venue, price, date, time, section row and seat. The system determines a confidence level for the OCR results. If the confidence level meets or exceeds a required confidence level, the OCR results are combined with the barcode and the ticket is digitized to create a mobile ticket. In an embodiment, a threshold confidence level can be about 60% to about 100%. In an embodiment, a threshold confidence level is at least about 80% to about 95%. In another embodiment, the threshold confidence level is 90%. If the confidence level is less than the threshold confidence level, the photo and the OCR results may be reviewed manually, errors are corrected and the digital ticket is created. Where errors cannot be corrected, a request to reimage the paper ticket is generated and transmitted to the user's computing device.

In one embodiment, a mobile application running on a mobile device can perform the digitalization of tickets. Digital tickets can include a barcode and an indicator, such as an animation, that indicates whether the ticket is useable. The indicator can be discontinued after the digital ticket is used for the event, whether that is single, multiple, season tickets, and/or the like. The digital ticket can be stored on the user's computing device, the system, and/or the transferee's mobile device.

In one implementation, a method of creating and distributing a digital version of a paper ticket includes receiving, at a computing device, a digital photo of the paper ticket; generating, through correspondence with a computer system, an electronic ticket that is a digital version of the paper ticket, the electronic ticket being generated based on optical analysis of the digital by one or more of the computing device and the computer system; outputting, in a user interface on the computing device, selectable options related to the electronic ticket, wherein the selectable options include, at least, an option to sell the ticket on the computer system; receiving, through the user interface, user input comprising selection of the option to sell the ticket; transmitting, by the computing device, a request to the computer system to host the electronic ticket for sale; receiving, at the computing device, a unique URL that is associated with an internet-accessible resource for purchasing the electronic ticket over the internet, the URL being specific to the electronic ticket; outputting, in the user interface on the computing device, selectable features to distribute the URL, directly or indirectly, to other computing devices; receiving, through the user interface, selection of one or more of the selectable features that correspond to one or more particular distribution channels; transmitting, by the computing device, at least the URL along the one or more particular distribution channels.

Digital tickets can be transferred to a transferee in any of a variety of ways. For example, the controller prompts the user to input contact information for a designated transferee. Contact information may include but is not limited to a name, a mobile phone number, an email address, and an electronic ID. Upon receipt of the contact information, the controller generates an electronic message to the transferee via the contact information. The message includes a link to the mobile app, information about the ticket and information about the application. The message can further include instructions for accepting the transfer of the ticket from within the application. Upon acceptance of the transfer from within the app, the controller electronically transfers the claimed digital ticket via the contact information, which is stored in a file on the second computing device.

In another example, a user, using the app, can transfer a digital ticket to another person's (recipient's) mobile device as a hyper link embedded in a text message. The recipient of the text message then clicks or selects the link, and enters identification information, such as the last 4 digits of his/her mobile phone number, into an input field. Where the identification information matches the information inputted by the owner of the ticket, the recipient is then able to access the mobile ticket. If the information does not match the identification information inputted by the user, the system generates a message to the user to check/reenter the identification information.

In a further example, a ticket owner can upload a digital ticket to a computer system that can generate a URL for a site that is specific to the sale of the digital ticket. The ticket owner can then distribute the URL to other users, who can use the URL to access the site to purchase the digital ticket. Once purchased, the digital ticket can be transferred to the buyer, such as through a download or message, and can be removed from an account associated with the owner.

As used herein, the term "about" is meant to include +/−10% of the value. Terms such as "top," "bottom," "right," "left," "above", "under", "side" "front", "below" "upper", "back" and the like, are words of convenience and are not to be construed as limiting.

The disclosed technology can include the features described in this document as well as additional and/or optional features that are not explicitly described in this document or in combinations not explicitly described. Features described in this document can be combined in alternative and additional ways that are not explicitly described.

Numerical ranges as used herein are intended to include every number and subset of numbers contained within that range, whether specifically disclosed or not. Further, these numerical ranges should be construed as providing support for a claim directed to any number or subset of numbers in that range or to be limited to the exact conversion to a different measuring system, such, but not limited to, as between inches and millimeters.

All references to singular characteristics or features shall include the corresponding plural characteristic or feature, and vice versa, unless otherwise specified or clearly implied to the contrary by the context in which the reference is made.

All combinations of methods or process steps as used herein can be performed in any order, unless otherwise specified or clearly implied to the contrary by the context in which the referenced combination is made.

BRIEF DESCRIPTION OF THE DRAWINGS

FIG. 12 is a conceptual diagram of an example system for creating and transmitting electronic tickets.

DETAILED DESCRIPTION

Figure 1:
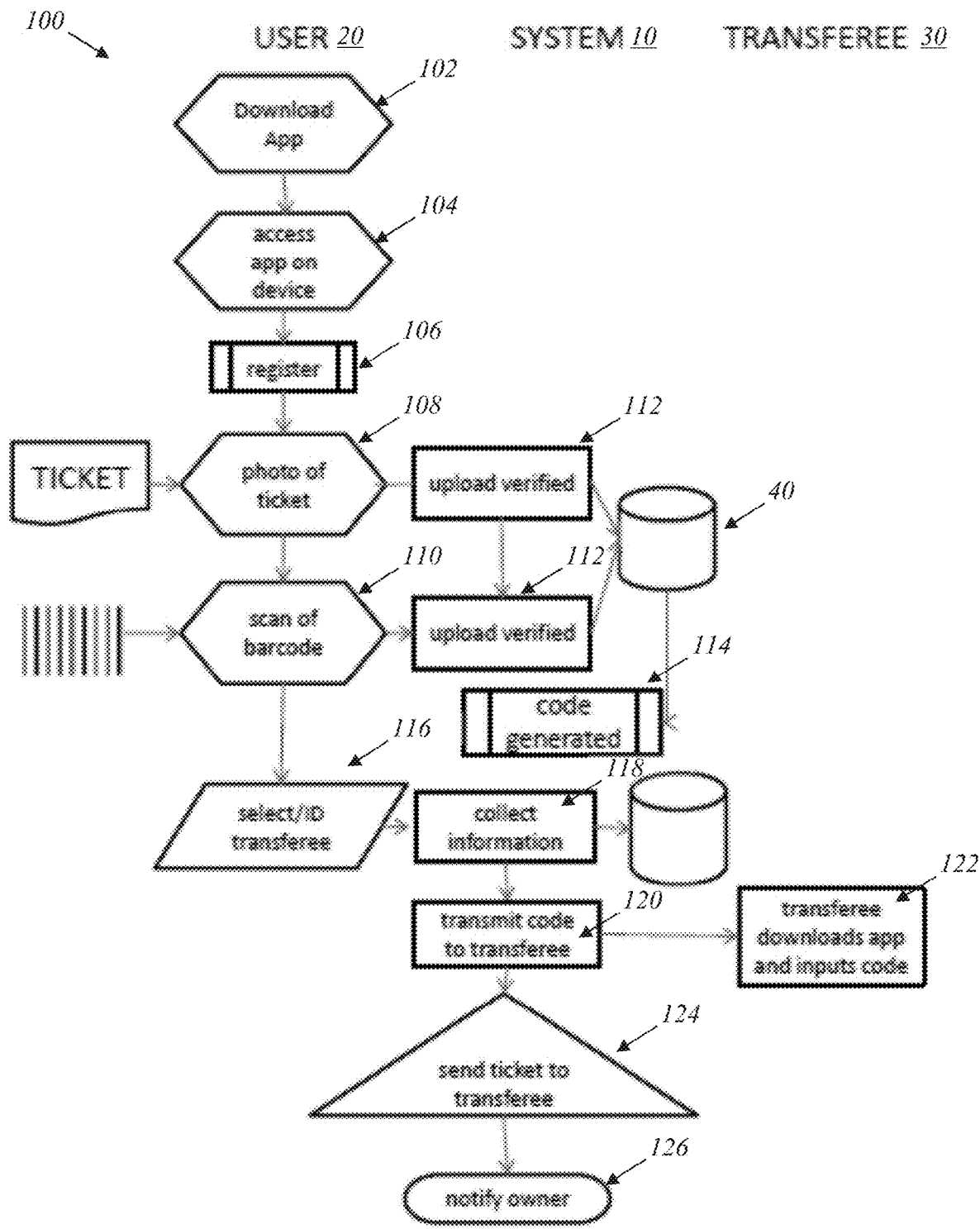
FIG. 1 is a flow diagram of an example method.

An example method 100 of transferring a ticket in a digital form is illustrated in FIG. 1. In an embodiment, a user with a paper, pdf, electronic or a photo of a ticket to a venue accesses a system 10 with a device 20 (e.g., mobile computing device, such as a smartphone, tablet, wearable computing device). The system 10 can include, for example, a central controller, processor or computer that facilitates the transfer of the ticket to a transferee, who can also access the system 10 via another device 30 (e.g., mobile computing device, such as a smartphone, tablet, wearable computing device). The controller 10 can include executable instruction, such as computer code, stored in a memory. The instructions generate the processes, including but not limited to screen prompts, graphic interfaces, messaging, data storage, and the like. The devices 20 and 30 can be in communication with the controller 10. In an embodiment, the devices 20 and 30 are in communication with the controller 10 via the Internet. In an embodiment the devices 20 and 30 are communication devices, a computer, a tablet, an iPad (Apple, Inc.), a smartphone (iPhone (Apple, Inc.), an android device (Google, Inc., etc.), a kiosk, and/or a device connected to any of the above, such as Pebble (trademark of Pebble Technology), Samsung Gear (trademark of Samsung), Apple Watch (trademark of Apple, Inc.), and the like.

In an embodiment, the user downloads a mobile application to the user's mobile device 20, such as a smart phone, tablet, and the like (102). The mobile device 20 includes an imaging device, such as a camera that can generate a frame to scan an object for optical character recognition (OCR), a speech recognition device, a global positioning system (GPS) and/or other location device, a monitor, an input device and the like.

In an embodiment, the user inputs information about the user, such as a username, phone number, address, email, password and the like into the system using the app. The system stores the information in a database (104). In an embodiment, the user, after downloading the mobile application, registers electronically by inputting information to establish an account (106). Alternatively, the mobile application prompts the user to access a social network or other third party system to obtain personal information to establish a user account.

One or more tickets to an event may be electronically transferred. The ticket is a ticket issued by the venue, a reseller, a printed PDF ticket, and the like. The ticket is to a venue or event, such as a sporting event, concert, play, movie, gathering, presentation, and the like. The event can be a single event or multiple events, such as season tickets or multiple passes. A ticket can be for a single use or a season-ticket or multiple entry pass, such as but not limited to season passes for sporting events such as football, hockey and soccer, tennis, racing and golf matches as well as entertainment and art passes to multiple events.

With reference to the example embodiments depicted in FIGS. 3-7, the user 20 uses the mobile app to create an electronic ticket. The user clicks a sign on a screen of the app on the device to input information to the controller. The information comprises a title of the event, venue, date, section, seat and the like. As depicted in the example in FIG. 3, the mobile app prompts the user/ticket holder to take a photo of the ticket (108). The user takes a photo of the ticket with all information, including the barcode, captured within the photo as prompted by application (110). The barcode can be a one-dimensional bar code, two-dimensional QR code, 2-dimensional matrix code, hologram, 3D barcode, color code, image code, combination code and the like.

The system 10 comprises data identification and data capture algorithms and technologies, such as a proprietary optical character recognition (OCR) system, speech recognition systems, decoders and the like, that can automatically verify the content captured in the photo and/or the barcode scan (112). The OCR technology is used to detect symbols during the scan of the paper ticket, such as alphabets (including English, Chinese, Japanese, Cyrillic, Greek, Hebrew, Arabic, Farsi and the like) as well as other symbols (such as special characters, punctuation marks, math symbols, alphabet-modified characters, monetary symbols and the like). The system prompts the user to select a character string, such as the title of the event, venue, date, time, price section, row, seat, etc. A code for the ticket can be generated from the automatic identification and/or user-prompted input, and stored by the system 10 (114).

Figure 2:
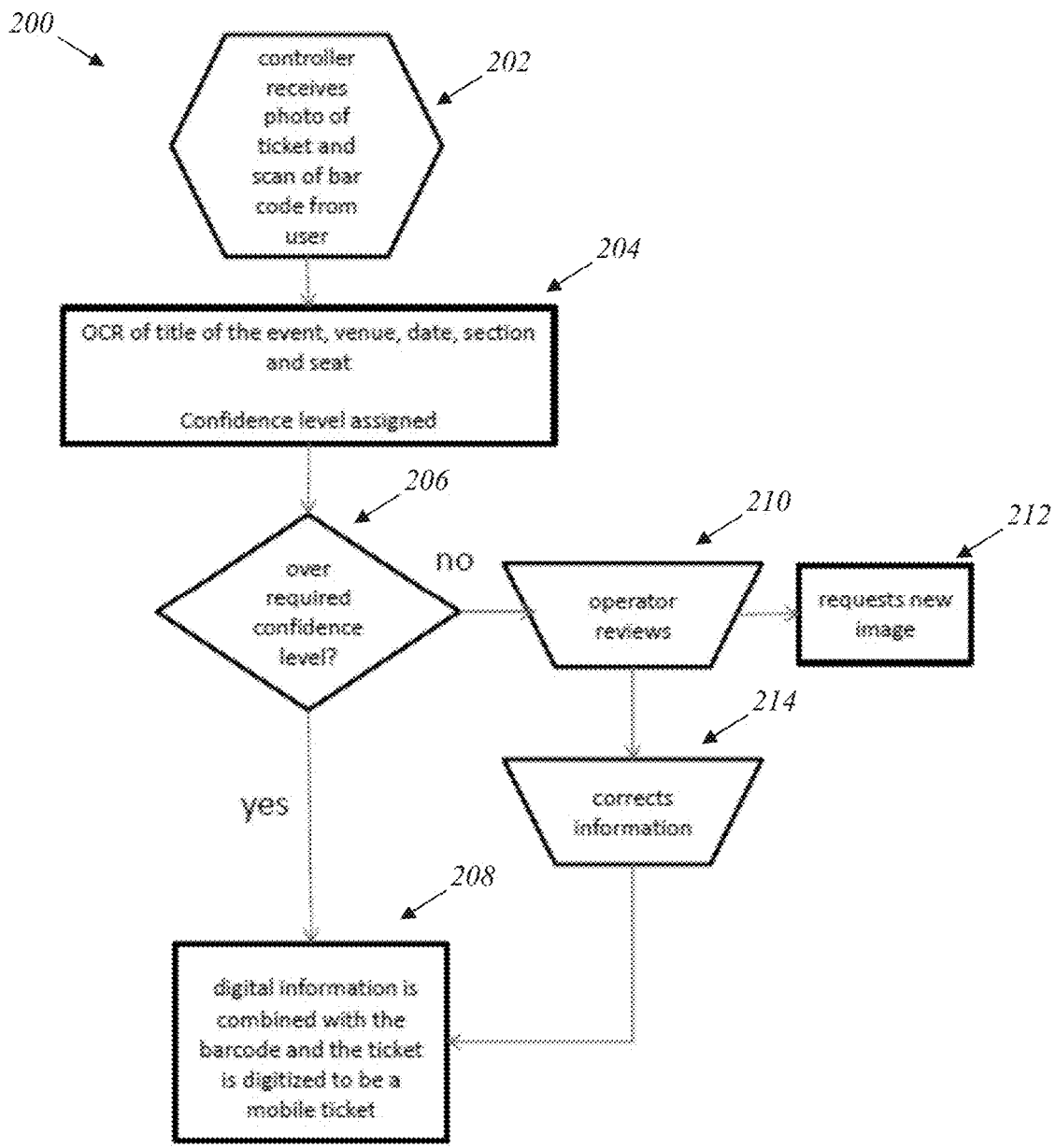
FIG. 2 is flow diagram of a method of processing ticket images.
Figure 3:
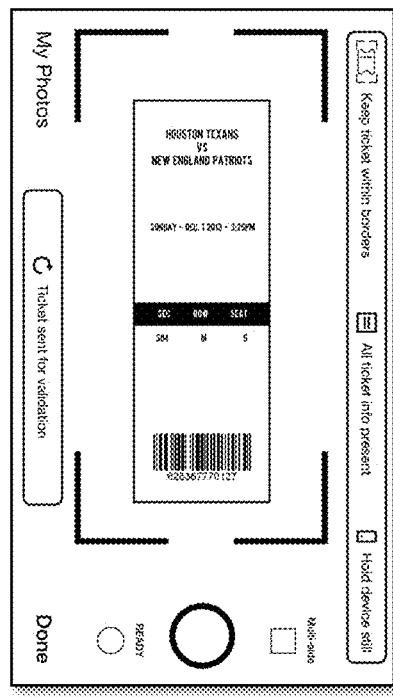
FIG. 3 is a screen shot of an example embodiment.

With reference to the example depicted in FIG. 2, the method 200 of processing images of the paper ticket is disclosed as an example of the verification and storing steps (112-114). At step 1 (202), the system 10 receives the photo of the paper ticket and the scan of the barcode. The barcode may be included in the image as well. At step 2 (204), an OCR result for each of the title of the event, venue, date, section and seat, as well as a confidence level as to the OCR result is assigned to the image. Factors that lead to the OCR confidence level are well known in the art of optical character recognition and image recognition. At step 3 (206), if the confidence level is greater than at least a threshold level (e.g., at least 80% or greater), then the process proceeds to step 5 (208) where the digital information is combined with the barcode and the ticket is digitized to be a mobile ticket. If the confidence level is equal to or less than a predetermined required level of confidence, then the process proceeds to step 4 (210). At step 4, the image and the OCR information is reviewed manually. Errors are corrected and a digital ticket is created (214). If the reviewer makes a determination based on the photo of the ticket that paper ticket is not valid, an error message is sent to the user to reimage the paper ticket (212).

Figure 4:
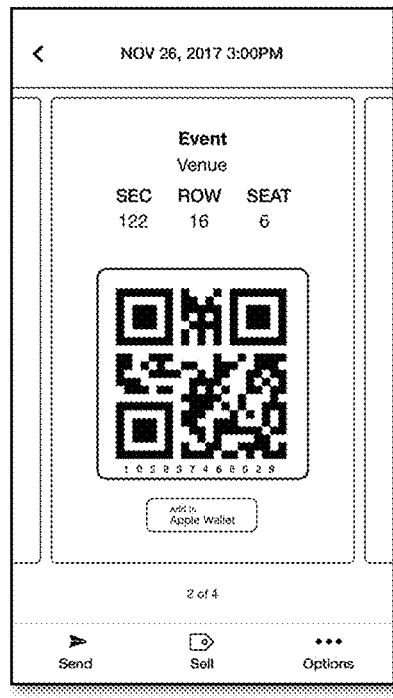
FIG. 4 is an example of a ticket.
Figure 5:
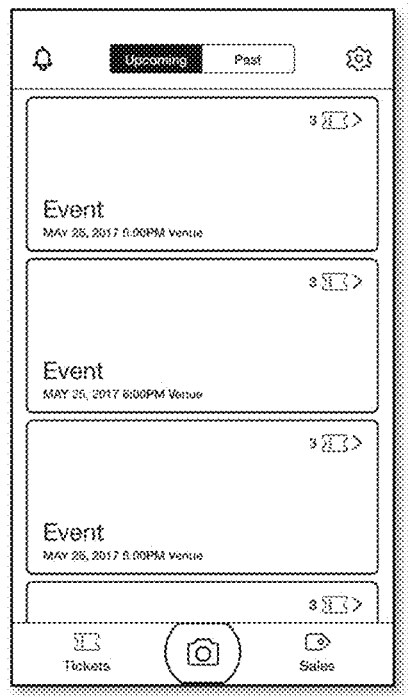
FIGS. 5-10 are screen shots depicting an example embodiment.
Figure 6:

Referring back to FIG. 1, the controller 10 processes the inputted information and provides an image of the digital ticket to the user. Upon completion of the process, a mobile ticket is created (FIG. 4). The controller 10 assigns an identifier to each electronic ticket (e.g., as part of step 114). In an embodiment, the controller assigns a thumbnail image to each ticket based on the type of event. In an embodiment, the background image represents a particular event, such as an image or a concert venue, a sports field, and the like. Where a user has inputted multiple tickets, the controller provides a list of the electronic tickets to the user (FIG. 5) that comprises the thumbnail image and information about the ticket group. In an embodiment, the list is provided on a screen titled "Tickets". In an embodiment, the system 10 stores information, searchable by the identifier, about each ticket in a database 40 connected to the controller 10. In an embodiment, the digital ticket is stored on the device of the user.

The electronic ticket has a barcode that is displayed at the event to admit the owner. The barcode is readable by any barcode reader or scanner. The system 10 creates an indicator, such as but not limited to a flickering flame, a bouncing ball, a dancing musical note, and the like) on the electronic ticket to indicate that it is a live ticket and not a picture.

For season or multiple day tickets, the ticket can be used over and over until the expiration date or number of uses are exceeded.

Figure 7:

To transfer a ticket to a transferee 30, in one example embodiment, the user selects a ticket group from the list depicted in the mobile app and then clicks a "send" button (116). The system 10 provides a graphic to the user device 20 to select specific tickets to transfer. The system 10 provides a graphic to the user 20 to input the transferee information (FIG. 6) (118). In an embodiment, the user 20 selects a transferee 30 from a person listed in the user's contacts on the device. In an embodiment, the user 20 enters the name and mobile number of the transferee 30. The ticket link and information is electronically sent in a notice to the transferee (120). In an embodiment, the notice is a text message. In an embodiment, the notice is transmitted in any electronic manner to a communication device, computer, tablet, smartphone (iPhone, Android), a kiosk, wearable and the like accessible by the transferee 30. The notice can include information about the ticket, including but not limited to the identifier, sender, etc.; instructions on accessing the application; and the like. In this embodiment, the transferee 30 downloads the app (if not already on the transferee's device), opens the app, and clicks a sign in a graphic generated by the system for the app (a transferee app-less embodiment is described below) (122). In an embodiment, the sign is a "+". In an embodiment, the sign is a choice from a menu. The transferee 30 selects "Accept Transfer". The system 10 securely transfers the ticket in electronic form to the transferee's device (124) and notifies the previous owner (user 10) of the transfer (126). In an embodiment, the system 10 stores each electronic version of the ticket on the transferee's device 30 (FIG. 7).

Figure 11:
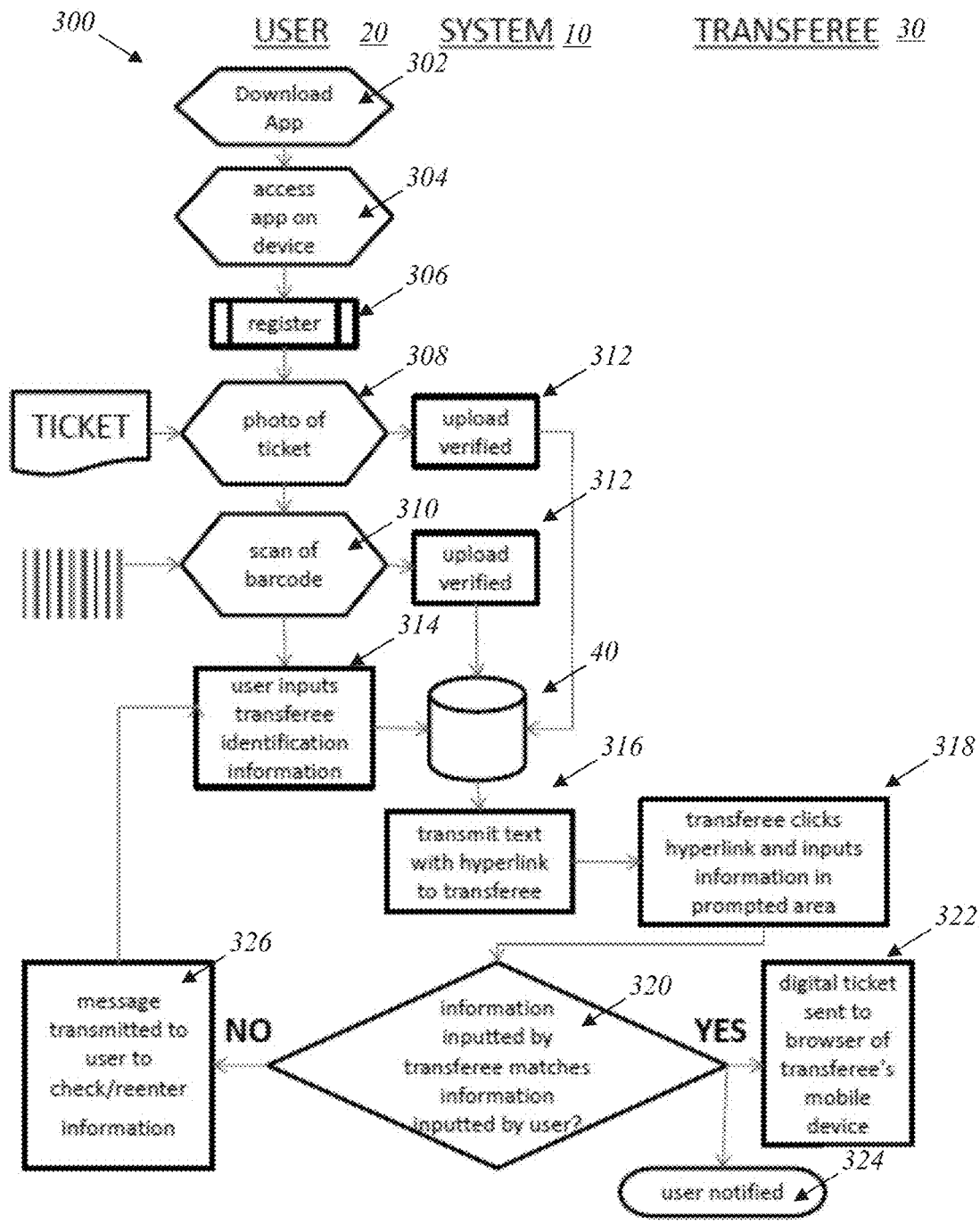
FIG. 11 is an alternate embodiment.

In an alternate embodiment depicted in FIG. 11, an example method 300 (similar to the method 100) includes a user, using the app, transfers a digital ticket to another person's (recipient's) mobile device as a hyperlink embedded in a text message. Here, the user 20 and system 10 perform steps 302-312 similar to steps 102-114 to upload a ticket, as described above with regard to FIG. 1, and then the user 20 (transferor) accesses a mobile app or broker platform using a mobile device or a PC to initiate a transfer of a ticket to a venue to another party. After taking a photo of the ticket and scanning the bar code, the user 20 inputs identification information (such as name and telephone number) about the recipient or transferee 30 (314). The system 10 generates a text message to the transferee 30 (316). The text message comprises a hyperlink, which is a unique link to the ticket. The recipient 30 of the text message then clicks or selects the link, and is prompted to enter identification information, such as, but not limited to, the last 4 digits of his/her mobile phone number, email address, recipient's name, entire phone number, PIN code, or any other field or process that identifies the recipient, into an input field (318). The identification information input serves as an extra layer of security to deter fraud or ticket data breach. If the identification information (such as the last four digits of the cell phone entered by the transferee in this example) match the identification information (the last 4 numbers of the cell phone number) entered by the transferor, the mobile ticket is made available on the transferee's mobile device 30 (320). If the information does not match, then the user 20 is requested to check or reenter the information (326). In this embodiment, the ticket is transferred to the browser (such as Android Browser, Chrome (trademark of Google, Inc.), Internet Explorer (trademark of Microsoft Corporation), Safari (trademark of Apple, Inc.), Opera Mini (trademark of Opera Software), and the like) of the mobile device of the transferee 30 (322). The transferee 30 can then view the ticket, use it to enter into the venue and/or add it to a digital storage area, such as Passbook or Wallet (trademarks of Apple, Inc.), that serve as single repository for event tickets, directly from the browser. The information made available to the transferee 30 includes a link to download or open the ticket in the system's app in case the transferee 30 wants to transfer or sell the mobile ticket.

Before the ticket is claimed, the electronic ticket generated by the system 10 on the owner's device 20 provides a status as "pending." At any time prior to being claimed, a transferred ticket is still viewable by the owner 20, but the bar code is not viewable by the owner/transferor, and the owner 20 can cancel the transfer using the app. When the electronic ticket is claimed by the transferee 30, the electronic version of the ticket is removed from the owner's device and the system's database 40. When the ticket is claimed, the owner 20 receives an electronic notice of the transfer (324), such as a confirmation email, text message or other electronic message sent to the user's email address or other suitable communications application.

Figure 8:
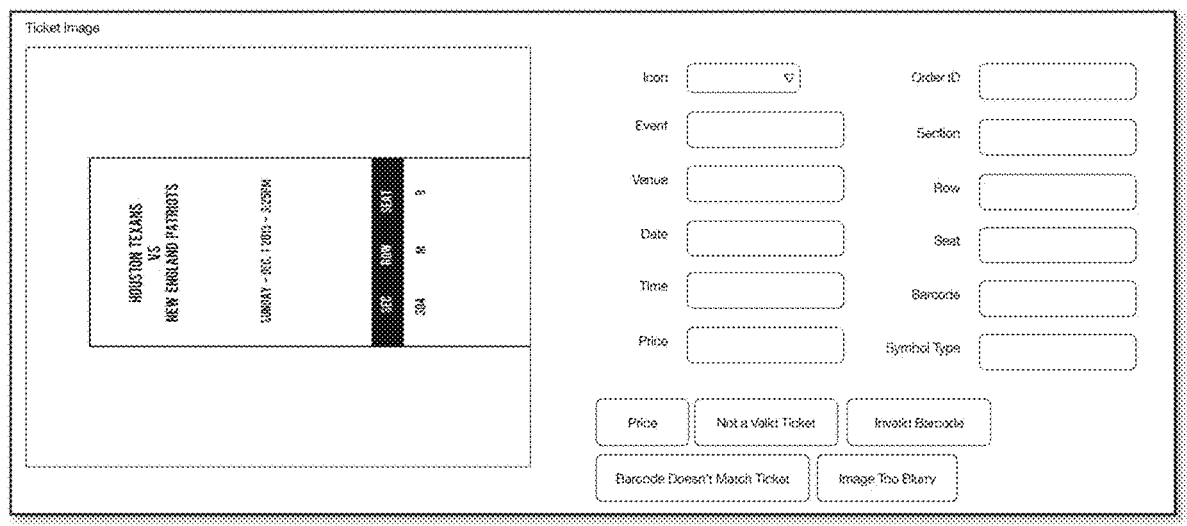
Figure 9:
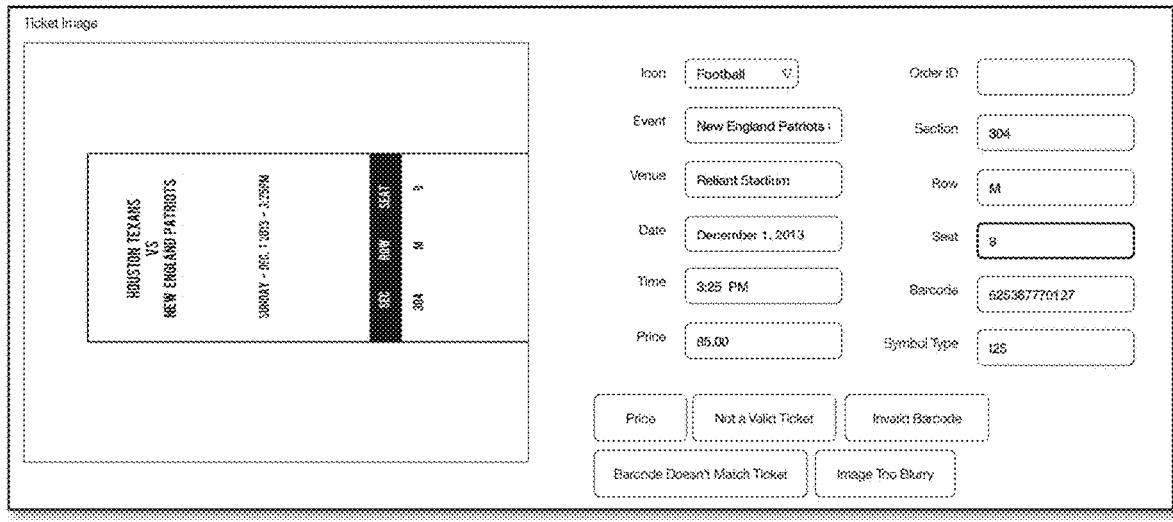
Figure 10:
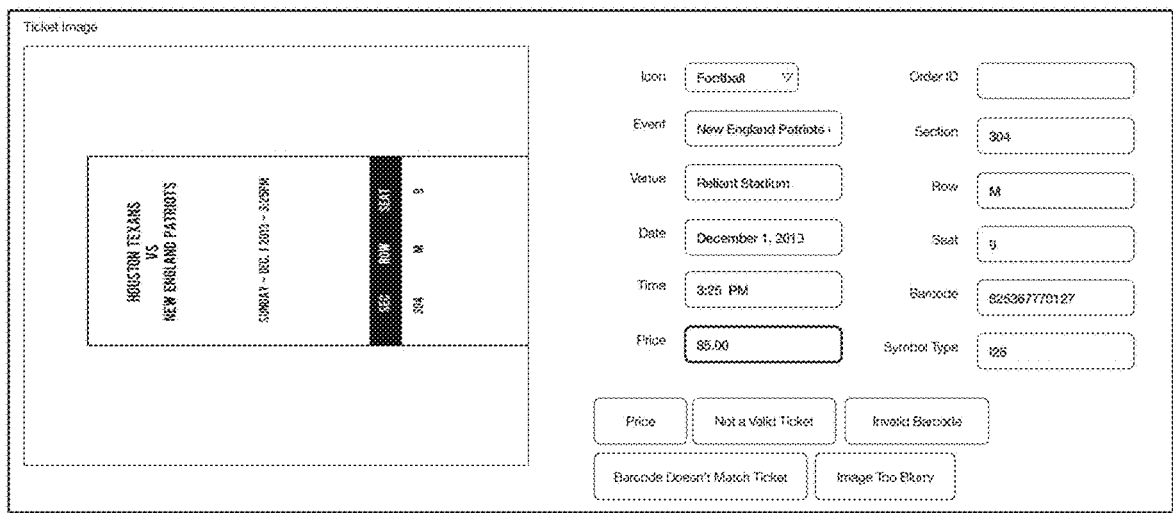

FIGS. 8-10 are examples of the technology that generate the digital ticket information. These examples include proprietary model files that the controller uses based on the origin of the ticket. The OCR technology uses parallel processes to digitize text. The OCR technology creates raw text, segments and lattice files corresponding to each line of the ticket to create a character model. The OCR technology creates a file containing the segmented characters and aligns each to a corresponding text file. The OCR technology comprises classifiers within the software, including but not limited to linear classifiers. The OCR technology compares the text file assuming that the document has an overall linear design, is composed of a similar fonts and is written in a single language. The OCR technology also comprises vertical and right to left character recognition and encoding for other languages.

As depicted in FIG. 8, the OCR technology converts text on the paper ticket and populates corresponding data fields (such as EVENT, VENUE, DATE, TIME, PRICE, SECTION, ROW, SEAT, and the like) in the system. The OCR technology searches the scanned object for matches to character strings such as the words (or part of the word): title, venue, date, time, price, section row and/or seat. Such OCR techniques can be used to identify the location of the matched character string to automatically identify and annotate text in an expected corresponding location. When a match to the character string is found, the match is used to find text on the ticket to populate a field associated with the matched character string. The system creates a matrix of boxes from the center of the matched character string that moves outward in all 4 directions (down, right, left, up) to capture expected values for that text. The system cancels out noise and artifacts. The captured values are selected based on an expected distance and direction from the matched character string, the type of ticket (for example, pdf vs. traditional) and the format of ticket. If not found within the given distance in the first direction, the system moves to a second direction. A minimum distance classifier is used to assign the right text to a field based on its distance from the matched character string. Boxes that contain only a connected component greater than about 20 pixels in area are captured and examined. In a preferred embodiment, boxes that contain only a connected component greater than about 40 pixels are captured.

For example, FIG. 9 depicts an example of the OCR technology searching a ticket for, among other character strings, the letters "SEC". When located, the OCR system marks the location of the matched character string "SECTION" and creates the matrix of boxes around the word SECTION. In this example, the OCR technology firsts moves a given distance in the first direction from the located matched character string. The direction and the given distance are programmed based on the location and or appearance of the matched character string. As depicted in FIG. 9, the letters SEC are located at a given sector on the paper ticket. The OCR technology comprises a database of common ticket appearances that the system compares to the location of the located matched character string. The database comprises common given distances for such tickets, such as "touching the located matched character string" as well as directions, such as "below". In this example, the OCR technology first searches immediately below the located matched character string. In an alternate embodiment, the given distance is determined based on the spacing of the located matched character string. In an alternate embodiment depicted in FIG. 10, the OCR technology is programmed to search for and capture expected values for text below the located matched character string at distance of about 1.5 the font size of the SEC.

As depicted in FIG. 9, the OCR technology populates the SECTION field with "FLOOR4". As depicted in FIG. 10, the OCR technology populates the SECTION field with "304". The system moves through each of the fields and inserts text in each of the fields based on the correlated matched character string.

Where no matched character string was located for various elements in the ticket, such as PRICE, error messages requiring manual review can be generated, such as INVALID BARCODE, BARCODE DOES NOT MATCH TICKET and IMAGE TOO BLURRY. Upon an error message, the system flags the ticket and notifies the administrator for a manual review and input. The administrator reviews the flagged ticket, inputs the missing information and the electronic ticket is created. If the missing information cannot be corrected, notification is sent to the owner who can rescan the paper ticket.

Data can be stored as part of this technology. In an embodiment, a data storage device 40 is connected to the controller 10. The data storage device 40 is any mass storage device known in the art. In an embodiment, the data storage device 40 is suitably adapted to store user and transferee information, document data, image data, transfer codes linked to transferees, transferors and digital tickets, and the like, and to temporarily store image data, modified image data, barcode data and the like. In addition, the system updates the user's account history to reflect revised information and to enable the user to see transferred and untransferred mobile tickets and other suitable information. In an embodiment, the method is used to issue a digital ticket where an event is rescheduled or the venue is changed. The disclosed technology can allow the transfer of tickets anywhere in the world where users and transferees are connected to the system.

FIG. 12 is a conceptual diagram of an example system 1200 for creating and transferring electronic tickets through persistent, ticket-specific URLs. FIG. 12 also illustrates an example flow of data within the system 1200 during steps (A) to (P), where the steps may occur in the illustrated sequence, or they may occur in a sequence that is different than in the illustrated sequence. For example, two or more of the steps may occur concurrently.

The example system 1200 includes a ticket computer system 1210, in communication with a ticket repository 1212. For example, the ticket computer system 1210 can be a computer server system, a cloud-based system, or another suitable configuration of computer server devices. The ticket computer system 1210 may be configured to execute application code associated with a variety of software components (e.g., modules, objects, libraries, services, etc.), including computer instructions to perform some or all of the method steps described below. The ticket repository 1212, for example, can implement databases, file systems, and other suitable mechanisms to add, remove, and maintain data used by the ticket computer system 1210, including user information, electronic tickets, ticket information, and resource reference (e.g., Universal Resource Locator (URL)) information. For example, the ticket computer system 1210 can generate and store electronic tickets in association with ticket-specific URLs in the ticket repository 1212, and can use the information in the repository 1212 to provide interfaces through which other users can purchase and obtain the electronic tickets through accessing the URL.

The example system 1200 includes one or more social network computer systems (e.g., social network computer system 1230), each social network computer system in communication with a respective social network repository (e.g., social network repository 1232). For example, the social network computer system 1230 can be a computer server system, a cloud-based system, or another suitable configuration of computer server devices. The social network repository 1232, for example, can implement databases, file systems, and other suitable mechanisms to add, remove, and maintain data used by the social network computer system 1230, including posts 1234 submitted by users of a social network platform. For example, social media posts that include a URL for an electronic ticket hosted for sale by the ticket computing system 1210 can be uploaded to the social network computer systems 1230 (e.g., FACEBOOK, TWITTER, CRAIGSLIST) for distribution to users of the social networking services hosted by the social network computer systems 1230.

The example system 1200 includes a plurality of user devices (e.g., transferor device 1220 and transferee device 1240). User devices, for example, may be any suitable type of computing device (e.g., mobile phone, smartphone, personal digital assistant, tablet computer, laptop or desktop computer, or other stationary or portable device) that includes one or more processors and computer readable media. Among other components, for example, the user devices 1220 and 1240 each include one or more processors, computer readable media that store software applications, input device(s) (e.g., touch screens, keyboards, computer mice, motion sensors, microphones, etc.), output device(s) (e.g., display screens, speakers, etc.), and communications interfaces. For example, the transferor computing device 1220 can create an electronic ticket from a physical ticket (e.g., to an event, to a venue) through communication with the ticket computer system 1210, can receive a URL for purchasing the electronic ticket on the ticket computer system 1210, and can distribute the URL to other users and their computing devices through the social network computer systems 1230. The transferee computing device 1240 can receive social media posts that include the URL through the social network computer system 1230, can navigate to a purchasing page/interface hosted by the ticket computer system 1210 that is specific for the electronic ticket using the URL, and can purchase/obtain the ticket through communication with the ticket computer system 1210.

The transferee computing device 1240 is one example device that receives social media posts from the social network computer system 1230 with ticket-specific URLs hosted by to the ticket computer system 1210. Distribution of the URL and social media posts containing the URL can be to a broader audience of users and computing devices than the example depicted in FIG. 1. Similarly, the transferor computing device 1220 is one example of a computing device posting electronic tickets on the ticket computer system 1210 for purchase through a ticket-specific URL. Other transferor computing devices and corresponding users can perform similar actions as the computing device 1220 to distribute tickets through the ticket computer system 1210 and the social network computer system 1230.

The ticket computer system 1210, the social network computer system 1230, and the plurality of user devices (e.g., transferor device 1220 and transferee device 1240) can be configured to communicate data over one or more networks, including include a wireless cellular network, a wireless local area network (WLAN) or WiFi network, a Third Generation (3G) or Fourth Generation (4G) mobile telecommunications network, an intranet, the Internet, or any other suitable network or any appropriate combination thereof.

As indicated by step (A), the transferor device 1220 communicates with the ticket computer system 1210 to create an electronic ticket. As described in detail above (e.g., with reference to FIG. 2), the transferor device 1220 can include an imaging device (e.g., a scanner, a camera) that captures data corresponding to a visual representation of a physical ticket (e.g., scanning and/or photographing a paper ticket). The captured data can be provided to the ticket computer system 1210, where optical character recognition (OCR) may be performed on the captured data (e.g., a digital photograph of the paper ticket). After performing OCR on the captured data, for example, the ticket computer system 1210 can identify various data elements associated with the ticket (e.g., event title, venue, date, section and seat, price) and can store the data elements as ticket information in the ticket repository 1212. The ticket information can be associated with an electronic ticket 1224 (e.g., a digital file) that includes a code 1226 (e.g., a unique identifier, a barcode), which can be stored by the ticket repository 1212 and can be provided by the ticket computer system 1210 to the transferor device 1220. After the electronic ticket 1224 is created, for example, the transferor device 1220 can present an interface 1222 that includes a notification that the ticket has been created, along with various options that may be performed in association with the created ticket, such as "sell" (e.g., selling the electronic ticket 1224 to another user, such as users of the social network computer system 1230), "save" (e.g., saving the electronic ticket 1224 for local storage on the transferor device 1220), "send" (e.g., sending the electronic ticket 1224 to another user, such as through text messages and/or emails), "view" (e.g., viewing a digital photograph of the electronic ticket 1224 and/or data elements associated with the ticket), and other appropriate options.

In some implementations, data elements associated with the ticket and/or a digital photograph of the ticket can be stored by the ticket repository 1212, and can be referenced using the electronic ticket 1224 and/or the code 1226. In some implementations, data elements associated with the ticket and/or a digital photograph of a ticket can be included in the electronic ticket 1224.

User information (e.g., a user identifier, phone number, email address, name, and/or other appropriate user information) associated with a user of the transferor device 1220 (e.g., an owner of the physical ticket) can be provided by the transferor device 1220 to the ticket computer system 1210 (e.g., during an account registration process), and can be stored by the ticket repository 1212.

As indicated by step (B), the transferor device 1220 receives user input corresponding to a selection of the "sell" option presented by the interface 1222. For example, the user input may include a selection of a user interface control, a voice command, or another suitable form of user input. In response to receiving the user input, for example, the transferor device 1220 can request a resource reference (e.g., a URL) that can be used to facilitate a sale of the electronic ticket 1224.

As indicated by step (C), the ticket computer system 1210 receives the request for the resource reference (e.g., a URL) for the electronic ticket 1224 from the transferor device 1220. In response to the request for the resource reference, and as indicated by step (D), for example, the ticket computer system 1210 generates the resource reference (e.g., the URL) for the electronic ticket 1224. For example, a URL for facilitating a sale of the electronic ticket 1224 can reference a webpage (e.g., generated by the ticket computer system 1210) that may include information associated with the ticket (e.g., event title, venue, date, section and seat, price). In some implementations, the information may additionally include a digital photograph of the ticket. The webpage can be hosted by the ticket computer system 1210, for example, or can be hosted by another system. The generated URL for facilitating a sale of the electronic ticket 1224, and optionally, the generated webpage referenced by the URL, can be stored by the ticket repository 1212.

As indicated by step (E), the ticket computer system 1210 provides the resource reference (e.g., a URL) for the electronic ticket 1224 to the transferor device 1220. After receiving a URL, for example, the transferor device 1220 can store the URL, and can enable various options for transferring (e.g., selling) the electronic ticket 1224 to another user of the system 1200.

As indicated by step (F), the transferor device 1220 receives user input to share information on the electronic ticket for sale, including distribution of the URL for the ticket on the ticket computer system 1210. For example, the user input may include a selection of a user interface control (e.g., a "send" button), a voice command, or another suitable form of user input. In response to receiving the user input, for example, the transferor device 1220 can generate one or more posts that reference the electronic ticket 1224. A post can include the received URL that references the webpage for facilitating a sale of the electronic ticket 1224, various data elements associated with the ticket (e.g., event title, venue, date, section and seat, price), and/or information associated with a user of the transferor device 1220 (e.g., username for the user of the transferor device 1220 on the social network computer system 1230). In some implementations, the transferor device 1220 can provide a user interface to facilitate the entry of a user-specified message (e.g., "Selling ticket to event!"), a user-specified price (e.g., $50), and/or a selection of one or more social network platforms for submitting the post(s). The user-specified price, for example, can be provided by the transferor device 1220 for storage by the ticket repository and associated with the electronic ticket 1224. In some implementations, the transferor device 1220 can automatically generate at least a portion of the message and/or specify a price based on the various data elements associated with the electronic ticket 1224 and based on the user information.

As indicated by step (G), the transferor device 1220 transmits a generated ticket post 1228 to the social network computer system 1230. The ticket post 1228 can include a resource reference (e.g., a URL) for the electronic ticket 1224, information associated with the electronic ticket, and user information corresponding to a user of the transferor device 1220 (e.g., username of the user on the social network computer system 1230). The ticket post 1228 can be provided to the social network computer system 1230, for example, through an Application Programming Interface (API) of the social network, computer system.

As indicated by step (H), the social network computer system 1230 stores information associated with the received ticket post 1228 in the social network repository 1232. The social network repository 1232, for example, may include many posts 1234 from users of a social network platform that are distributed to other users on the social network platform, such as in social media feeds.

As indicated by step (I), the social network computer system 1230 distributes information associated with the ticket post 1228 to one or more user devices. For example, a user of the transferee device 1240 (shown here as device 1240*a*) can access the social network computer system 1230 through a social network interface 1242*a* (e.g., a website, an application) presented by the device. In the present example, a user of the transferee device 1240 may be connected with a user of the transferor device 1220 (e.g., friends, followers) on a social network platform implemented by the social network computer system 1230, and information corresponding to the ticket post 1228 can be presented by the social network interface 1242, among other posts. As depicted in the example social network interface 1242*a* on the computing device 1240, the post created by the transferor computing device 1220 can be presented on the display of the device 1240 and can include a selectable URL (underlined in the depicted example) in the post.

As indicated by step (J), the transferee device 1240 (shown here as device 1240*a*) receives a selection of a resource reference (e.g., a URL). For example, a user of the transferee device 1240 can select a URL included in the ticket post 1228 presented by the social network interface 1242 to request a webpage referenced by the URL. In response to the selection of the resource reference (e.g., the URL), and as indicated by step (K), a request for a referenced resource (e.g., a webpage referenced by the URL) is transmitted by the transferee device 1240 (shown here as device 1240*a*) and is received by the ticket computer system 1210.

As indicated by step (L), the ticket computer system 1210 provides ticket information to the transferee device 1240 (shown here as device 1240*b*), in response to a received request for a referenced resource (e.g., a webpage referenced by a URL). For example, the transferee device 1240 can present an electronic ticket interface 1242*b* that includes ticket information associated with the electronic ticket 1224 (e.g., event title, venue, date, section and seat, price), an option to purchase the ticket, an option to send a message to a seller of the ticket, and other appropriate options.

As indicated by step (M), the transferee device 1240 (shown here as device 1240*b*) receives user input corresponding to a purchase selection. For example, the user input may include a selection of a user interface control, a voice command, or another suitable form of user input. In response to the purchase selection, and as indicated by step (N), a purchase request is transmitted by the transferee device 1240 (shown here as device 1240*b*) and is received by the ticket computer system 1210.

As indicated by step (O), the ticket computer system 1210 processes a purchase request. For example, the ticket computer system 1210 can update information in the ticket repository to reflect a change in ownership of the electronic ticket 1224 from a user of the transferor device 1220 to a user of the transferee device 1240. In some implementations, the ticket computer system 1210 can facilitate a transfer of payment from an account of the user of the transferor device 1220 to an account of the user of the transferee device 1240. After the purchase request is processed, for example, and as indicated by step (P), the ticket computer system 1210 provides the electronic ticket 1224 to the transferee device 1240 (shown here as device 1240*b*). For example, the electronic ticket 1224 can be removed from the transferor device 1220 prior to providing the ticket to the transferee device 1240.

Although the example system 1200 depicts the social network computer system 1230 being used to distribute the URL for the ticket to other users, other ways of distributing the URL to other users are also possible. For example, the transferor computing device 1220 can additionally and/or alternatively transmit the URL to the transferee computing device 1222 through one or more electronic messages, such as through text messages, email messages, chat services, social network messaging systems, and/or other messaging platforms. Other ways of distributing the URL to other users are also possible.

Figure 13A:
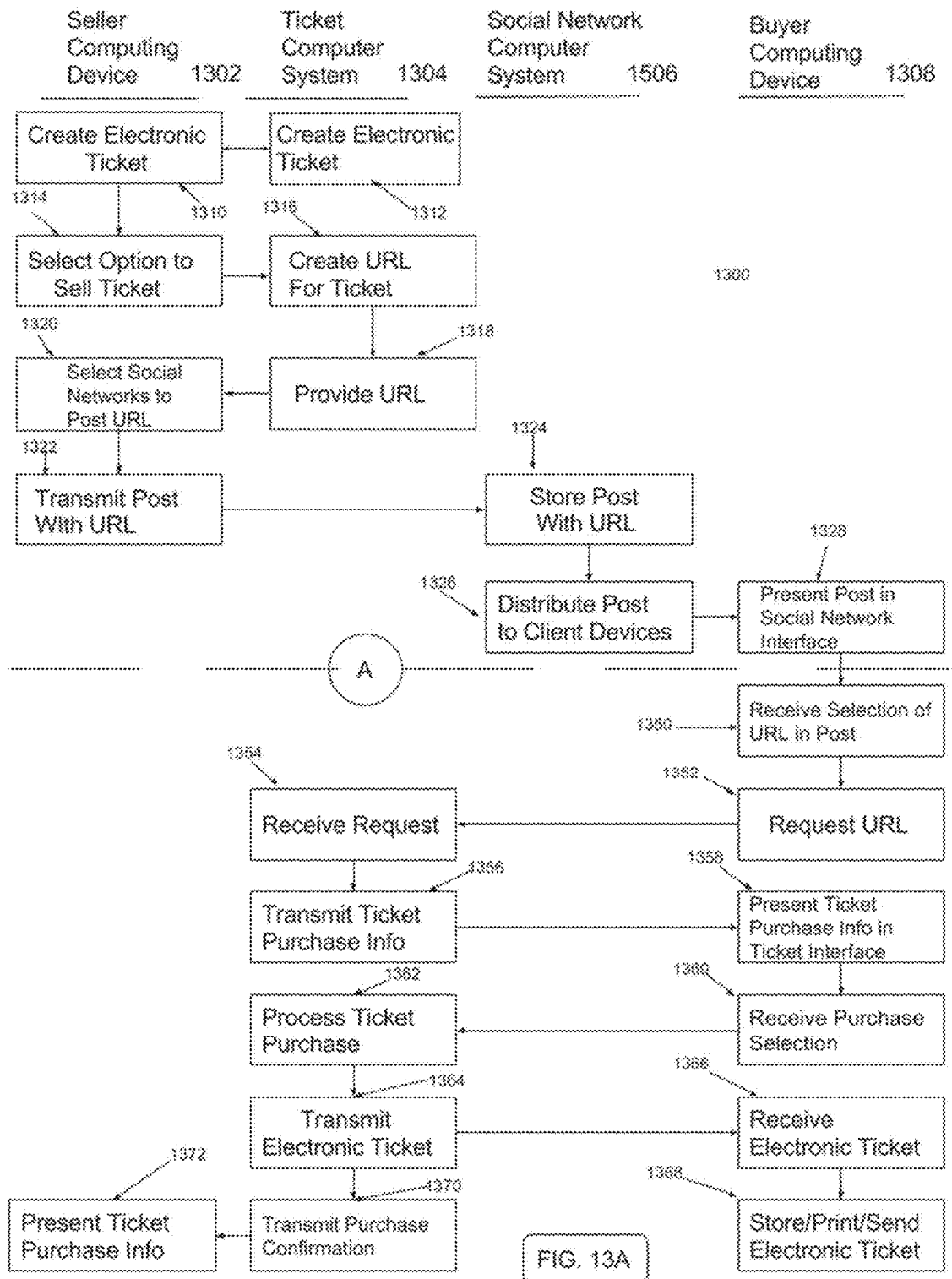
FIGS. 13A-B is a flowchart of an example technique for creating and transmitting electronic tickets.
Figure 13B:
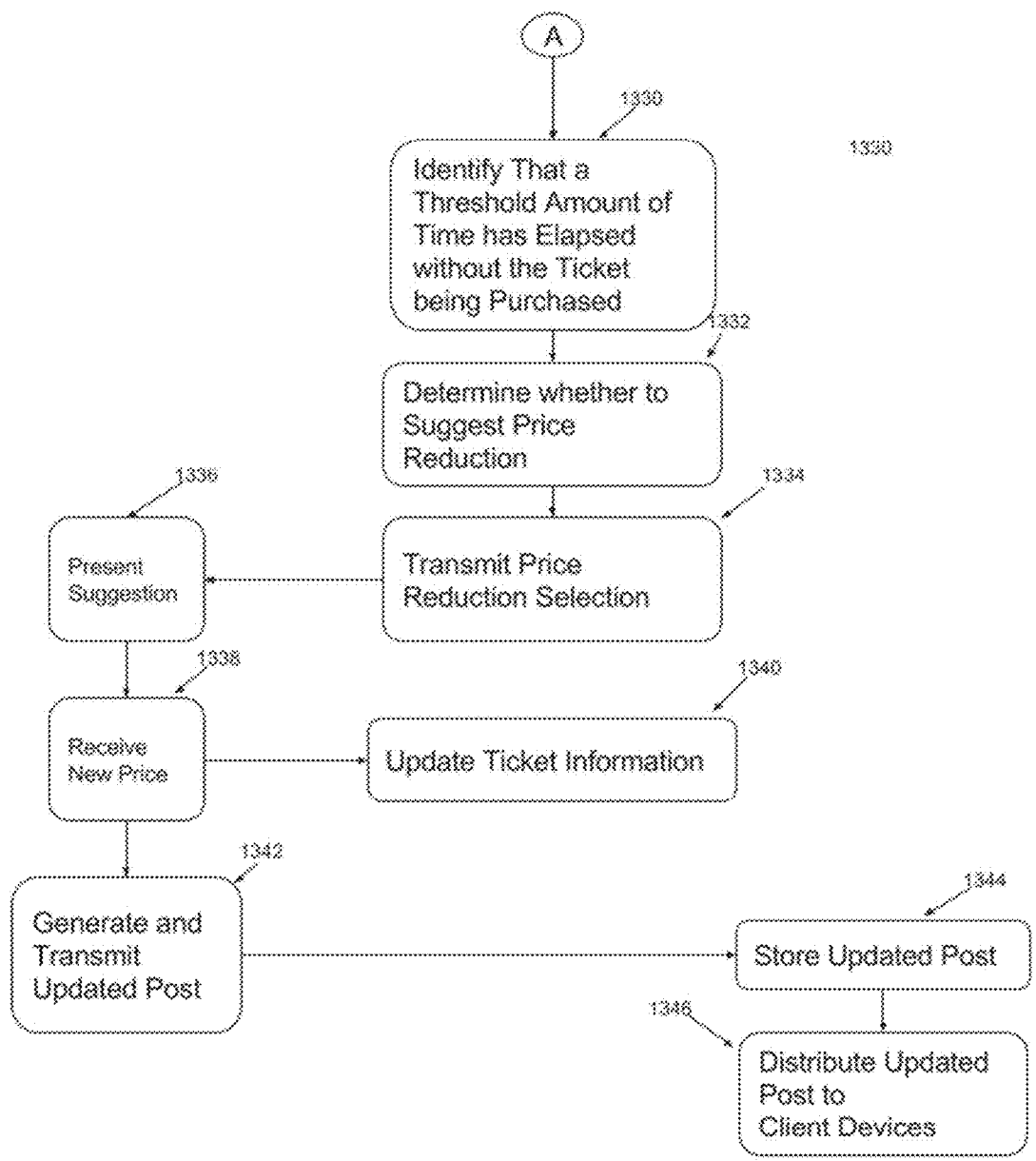

FIGS. 13A-B depict a flowchart of an example technique 1300 for creating and transmitting electronic tickets. The example technique 1300 is depicted as being performed by a seller computing device 1302 (e.g., similar to the transferor device 1220, shown in FIG. 12), a ticket computer system 1304 (e.g., similar to the ticket computer system 1210, shown in FIG. 12), a social network computer system 1306 (e.g., similar to the social network computer system 1230, shown in FIG. 12), and a buyer computing device 1308 (e.g., similar to the transferee device 1240, shown in FIG. 12).

At 1310 and 1312, the seller computing device 1302 communicates with the ticket computer system 1304 to create an electronic ticket. For example, at step (A) depicted in FIG. 12 the computing device 1220 and the ticket computer system 1210 can interact with each other to create an electronic ticket from a physical ticket. At 1314, after the electronic ticket is created, the seller computing device 1302 receives a selection of an option to sell the ticket and provides the selection to the ticket computer system 1304. For example, the user of the transferor computing device 1220 can select the "sell" option in the user interface 1222 in the device (step B), which can cause a request for a URL for the ticket to be transmitted to the ticket computer system 1210 (step C).

At 1316, the ticket computer system 1304 receives the selection of the option to sell the electronic ticket and creates a URL for the ticket, and at 1318, the ticket computer system 1304 provides the created URL for the electronic ticket to the seller computing device 1302. For example, the ticket computer system 1210 can generate the URL (step D), store the URL in the ticket repository 1212 in association with the electronic ticket, and can provide it back to the transferor computing device 1220 (step E).

At 1320, the seller computing device 1302 receives a selection of one or more social networks on which to post the created URL for the electronic ticket and, at 1322, the seller computing device 1302 transmits a post that includes the created URL for the electronic ticket to the social network computer system 1306. For example, the transferor computing device 1220 can present an option to select one or more social networking platforms to post the URL on, can present an interface to craft/customize a post for the ticket including the URL, and can transmit the post to the corresponding social network computer systems 1230.

At 1324, the social network computer system 1306 receives the post that includes the created URL for the electronic ticket from the seller computing device 1302, stores the post with the URL, and, at 1326, the social network computer system 1306 distributes the post that includes the created URL for the electronic ticket to one or more client devices. For example, the social network computer system 1230 receives the post 1228 with the URL for the electronic ticket (step G), stores it in the social network repository 1232 (step H), and distributes to the transferee computing deice 1240 (step I).

At 1328, the buyer computing device 1308 presents the post that includes the created URL for the electronic ticket in a social network interface. For example, the transferee computing device 1240 presents a user interface 1242a that includes the post and the selectable URL for the electronic ticket hosted on the ticket computer system 1210.

Referring to FIG. 13B, in some implementations, the technique 1300 may include suggesting price reductions and distributing corresponding post updates after one or more conditions have been met.

At 1330, the ticket computer system 1304 identifies that a threshold amount of time has elapsed without the electronic ticket being purchased. For example, the ticket computer system 1304 can identify that a threshold amount of time has elapsed when the electronic ticket not having been sold after a threshold period of time (e.g., three days, one week, two weeks, one month) since it was originally posted (e.g., not sold a week after the original listing) or after a most recent price reduction (e.g., not sold a week after the most recent price reduction). In another example, the ticket computer system 1304 can identify that a threshold amount of time has elapsed when the ticket has not yet sold within a threshold period of time (e.g., one hour, six hours, 12 hours, 18 hours, one day, two days, three days, one week) of the ticketed event occurring (e.g., not yet sold when the event will occur in two days). Such threshold periods of time can be designated/selected by the user of the seller computing device 1302, such as when the electronic ticket is originally posted and listed for sale with the ticket computer system 1304.

At 1332, the ticket computer system 1304 determines whether to suggest a price reduction for the electronic ticket. For example, the user of the seller computing device 1302 may have provided an acceptable range of prices for the ticket and the ticket computer system 1304 may identify whether further price reductions within that range are possible. In another example, the ticket computer system 1304 can leverage ticket sale information from ticket sales by other users on the ticket computer system 1304 for the same or similar events (e.g., same venue and event, same event but different venue, same venue but different event) to determine one or more prices at which the ticket will likely sell given the historical ticket sale information. Other options for determining whether and an amount for a price reduction are also possible. At 1334, the ticket computer system 1304 transmits the price reduction suggestion for the electronic ticket to the seller computing device 1302. For example, the ticket computer system 1210 can transmit a price reduction suggestion to the transferor computing device 1220 through in-app notifications (e.g., push notifications) and/or other messaging techniques, such as text message, email, social network messaging, and/or other notification techniques.

At 1336, the seller computing device 1302 presents information associated with the price reduction suggestion for the electronic ticket to a device user. The seller computing device 1302 can be programmed to output the price reduction information in a user interface with selectable options for the user to readily and easily accept or decline the suggested price reduction, or to submit a different price reduction. For instance, the seller computing device 1302 can output selectable buttons to accept or decline the price reduction, and can present an slider interface through which the suggested price can be altered. At 1338, the seller computing device 1302 receives user input corresponding to a new price for the electronic ticket and transmits data that represents the new price to the ticket computer system 1304, which the ticket computer system 1304 receives and uses to update ticket information (1340). For example, the ticket computer system 1210 can receive the new price from the transferor computing device 1220 and can use the new price information to update the ticket repository 1212 for the ticket. Updating the ticket information can cause the interface provided by the ticket computer system 1210 for the ticket accessible via the URL to reflect the new price information.

At 1342, the seller computing device 1302 generates an updated post and transmits the updated post to the social network system 1306. For example, the transferor computing device 1220 can be presented with an option to repost and/or update the existing posts on the social network computer system 1230 to reflect the new price, and can transmit the new posts and/or post updates to the social network computer systems 1230.

At 1344, the social network system 1306 receives the updated post from the seller computing device 1302, stores the updated post, and distributes the updated post to one or more client devices (1346). For example, the social network computer system 1230 can distribute the new and/or updated posts (step I) to the transferee computing device 1240 and to other computing devices associated with users of the hosted social networks. The steps 1330-1346 can be iteratively repeated until either the ticket is sold or until the day/time for the event identified in the ticket has passed.

Referring again to FIG. 13A, at 1350 the buyer computing device 1308 receives a selection of the URL included in the post for the electronic ticket. For example, the user of the computing device 1240 can select the URL in the interface 1242a. At 1352, the buyer computing device 1308 requests an electronic resource (e.g., a webpage) associated with the selected URL, from the ticket computer system 1304. For example, the computing device 1240 can transmit the request for the URL to the ticket computer system 1210 (step K).

At 1354, the ticket computer system 1304 receives the request for the electronic resource (e.g., the webpage) associated with the URL selected by the buyer computing device 1308, and, at 1356, the ticket computer system 1304 transmits ticket purchase information to the buyer computing device 1308. For example, the ticket computer system 1210 transmits the ticket information to the computing device 1240 (step L).

At 1358, the buyer computing device 1308 receives the ticket purchase information and presents the ticket purchase information in a ticket interface. For example, the computing device 1240 presents the ticket information in the user interface 1242b along with options related to the ticket, such as purchasing the ticket and/or messaging the seller. At 1360, the buyer computing device 1308 receives a selection of an option to purchase the electronic ticket associated with the received ticket purchase information, and transmits data that represents the selected purchase option to the ticket computer system 1304. For example, the computing device 1240 receives selection of a purchase option (step M) and transmits a purchase request to the ticket computer system 1210 (step N).

At 1362, the ticket computer system 1304 receives the data that represents the selected purchase option of the electronic ticket and processes a purchase of the ticket. For example, the ticket computer system 1210 processes the ticket purchase from the computing device 1240 (step O). At 1364, the ticket computer system 1304 transmits the electronic ticket to the buyer computing device 1308. For example, the ticket computer system 1210 transmits the electronic ticket to the computing device 1240 (step P), similar to the discussion above with regard to FIGS. 1 and 11 regarding transfer of the ticket to the transferee computing device.

At 1366, the buyer computing device 1308 receives the electronic ticket from the ticket computer system 1304, and, at 1358, the buyer computing device 1308 stores the electronic ticket and presents an interface that includes one or more options associated with use of the electronic ticket. For example, the interface may include an option to display the electronic ticket. As another example, the interface may include an option to print the electronic ticket. As another example, the interface may include an option to send the electronic ticket to another client device.

At 1370, the ticket computer system 1304 transmits data that represents a purchase confirmation to the seller computing device 1302. At 1372, the seller computing device 1302 receives the data that represents the purchase confirmation and presents an interface that includes ticket purchase information. Such confirmation may be provided through an in-app and/or out of application message confirming the sale, and can be accompanied with the ticket being removed from an account associated with a user of the seller computing device 1302.

Figure 14A:
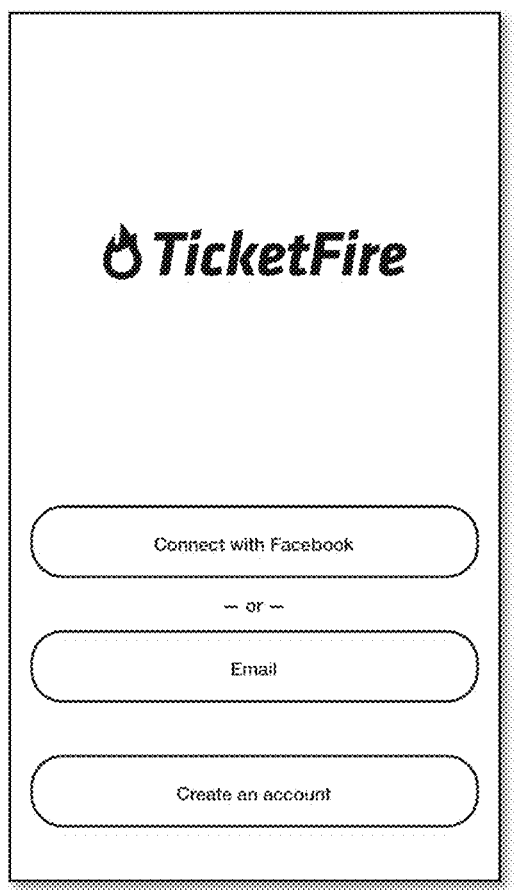
FIGS. 14A-Z, AA, and BB are screenshots of an example mobile application that can be used for creating and transmitting electronic tickets.

FIGS. 14A-BB are screens of an example mobile application that can be used for creating and transmitting electronic tickets. The example screenshots can be presented, for example, as part of the systems, techniques, devices, and methods described above with regard to FIGS. 1-13. For example, the screenshots can be presented on the user mobile computing devices 20, 30, 1220, 1240a-b, 1302, 1308, and/or other mobile computing devices.

Referring to FIG. 14A, a login screen is shown. The login screen, for example, may be initially displayed when the example mobile application is launched, and includes options to sign in to an existing account, or create a new account.

Figure 14B:
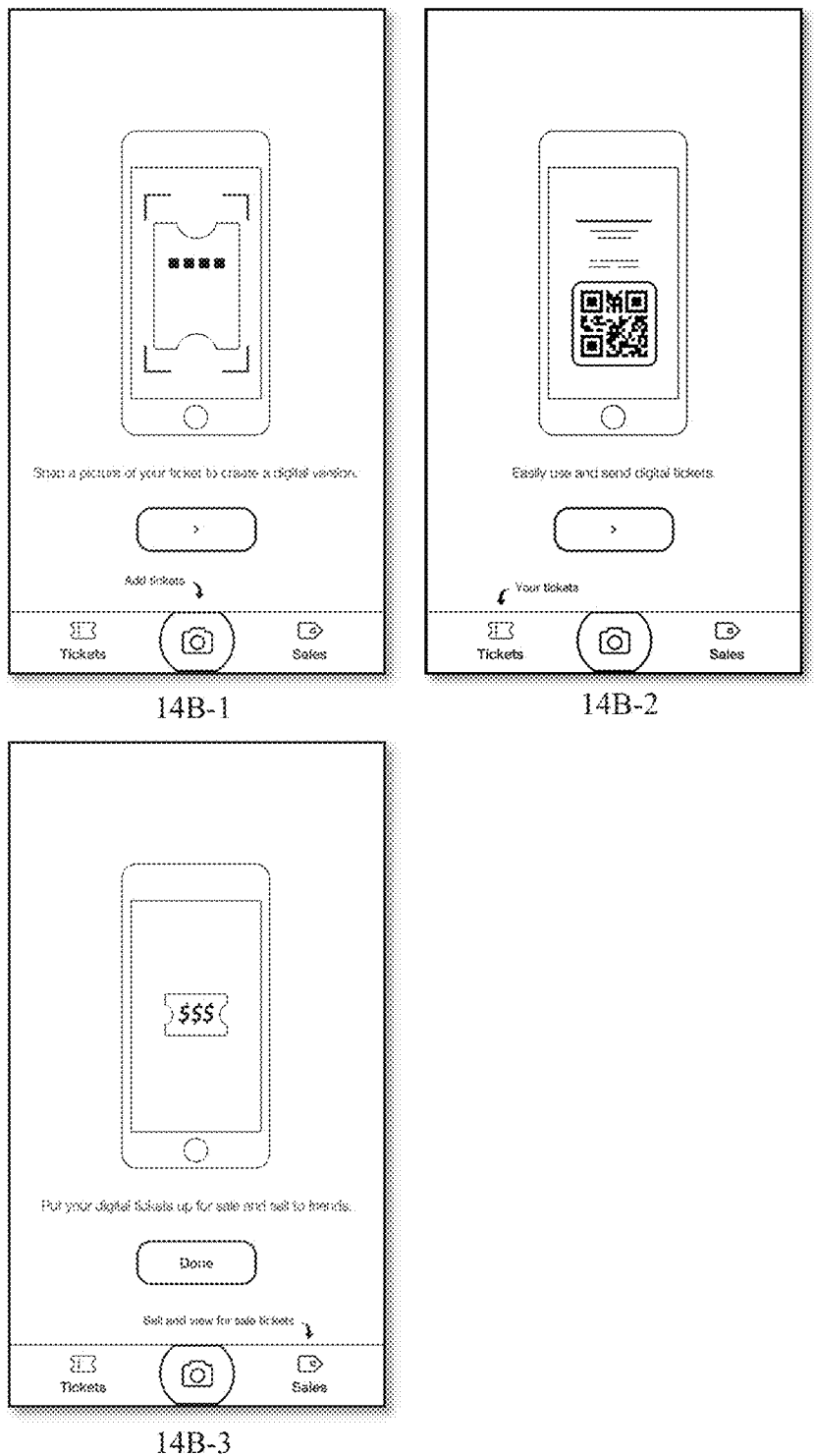

Referring to FIG. 14B, for example, a tutorial swipe-through is shown. The first example screen (14B-1) outlines the event ticket digitization capability and process. The second example screen (14B-2) details the capability to use or transfer a digitized event ticket. The third example screen (14B-3) details the capability to sell a digitized event ticket.

Figure 14C:
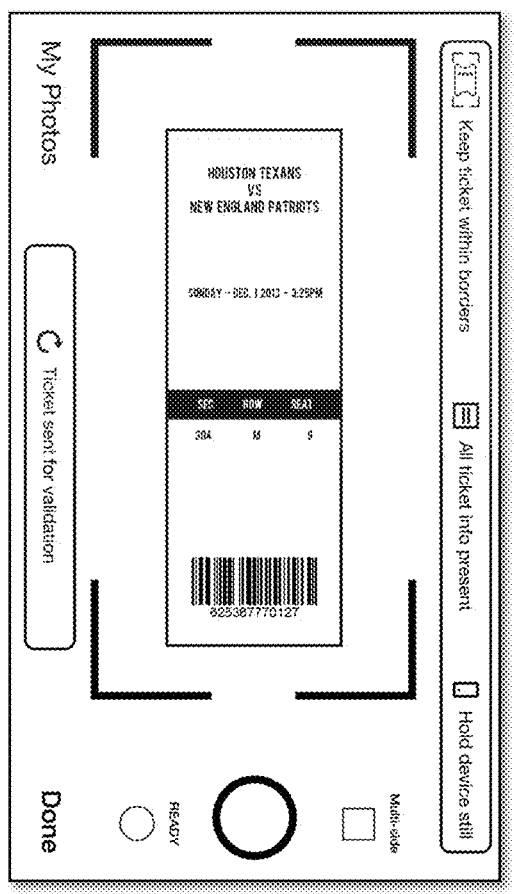

Referring to FIG. 14C, for example, a first digitize tickets screen is shown. In the present example, the first digitize tickets screen includes instructions for a user to take a photograph of a ticket with all event information clear and visible, including a barcode. Once the photograph of the ticket is taken, for example, a camera icon presented on the screen is removed, and the user is presented with options to retake or to confirm the photograph.

Figure 14D:
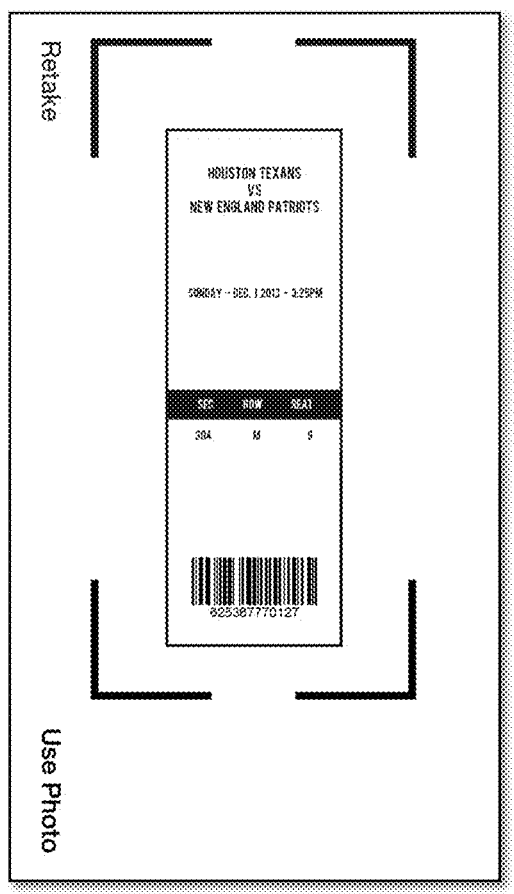

Referring to FIG. 14D, for example, a second digitize tickets screen is shown. The second digitize tickets screen includes an image corresponding to a digital photograph of a ticket. In the present example, after a user selects a "use photo" option, the user is returned to the first digitize tickets screen, and the photograph is transmitted for further processing (e.g., by the ticket computer system 1210, shown in FIG. 12). If a user selects a "retake" option, for example, the user is returned to the first digitize screen, and the photograph is not transmitted for further processing.

Figure 14E:
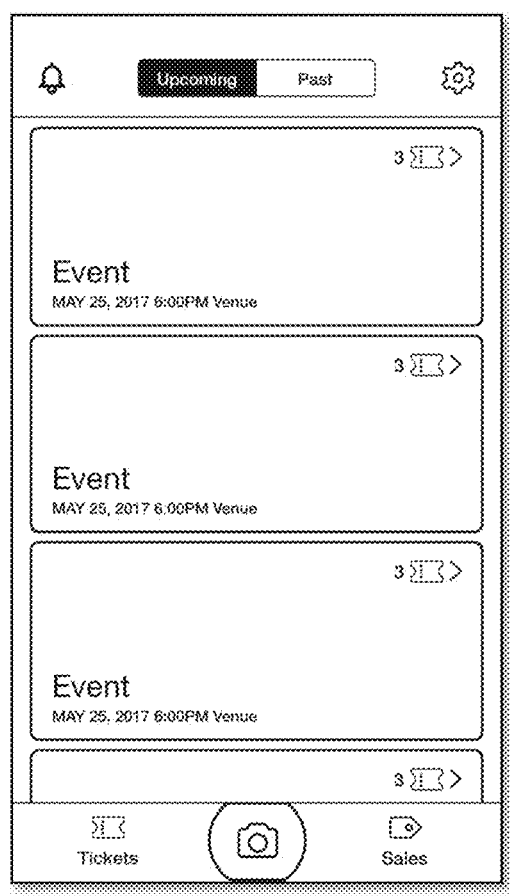

Referring to FIG. 14E, for example, an "upcoming tickets" screen is shown. The "upcoming tickets" screen displays representations of a user's tickets for upcoming events. The user's tickets are grouped by unique event and a ticket icon displays the number of tickets within each unique event group.

Figure 14F:
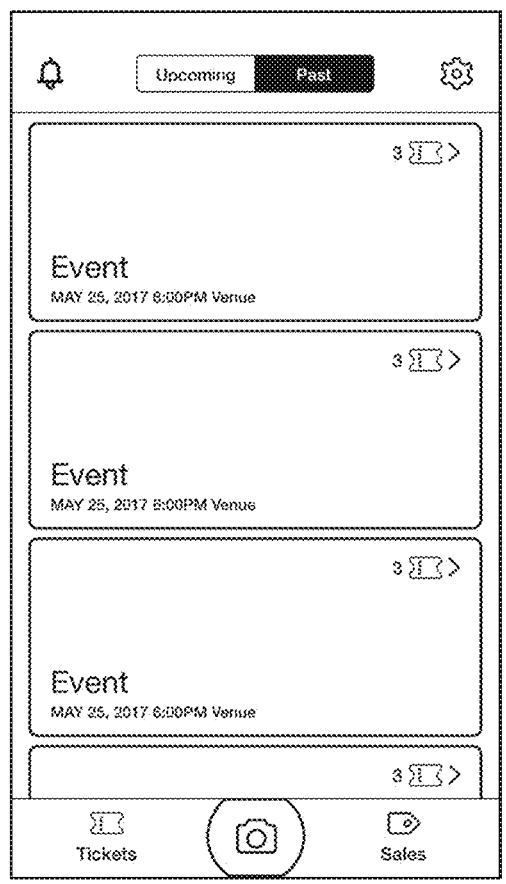

Referring to FIG. 14F, for example, a "past tickets" screen is shown, which may be presented in response to user selection of past events. Past event tickets, for example, may be presented in the same grouping format as "upcoming tickets", and may be viewed or deleted.

Figure 14G:
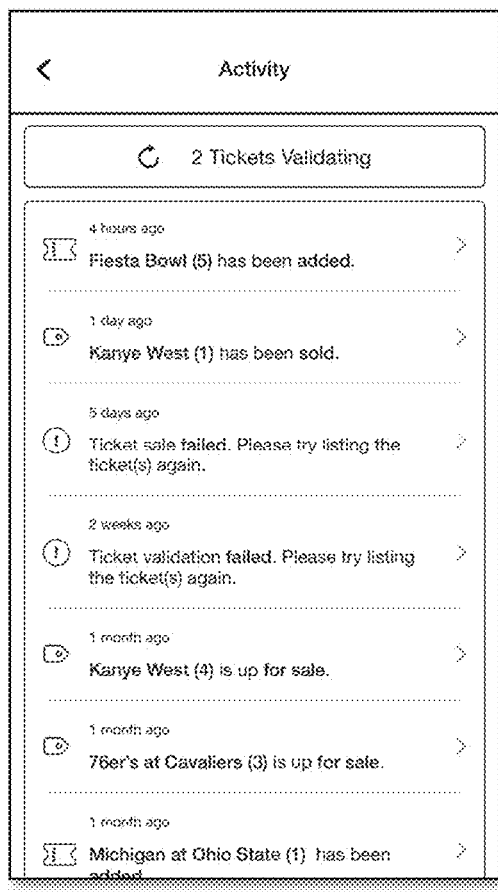

Referring to FIG. 14G, for example, current statuses of electronic tickets are presented within the activity page, and may be automatically updated as actions are taken upon the electronic tickets. For example, a current status can be "added" (e.g., as indicated by a blue ticket, or another suitable indicator), "failed" (e.g., as indicated by a red exclamation point, or another suitable indicator), "sold" (e.g., as indicated by a green tag or another suitable indicator), or another appropriate status. In some implementations, the "my tickets" screen may periodically be refreshed (e.g., every 30 seconds) such that current ticket statuses are updated.

Figure 14H:
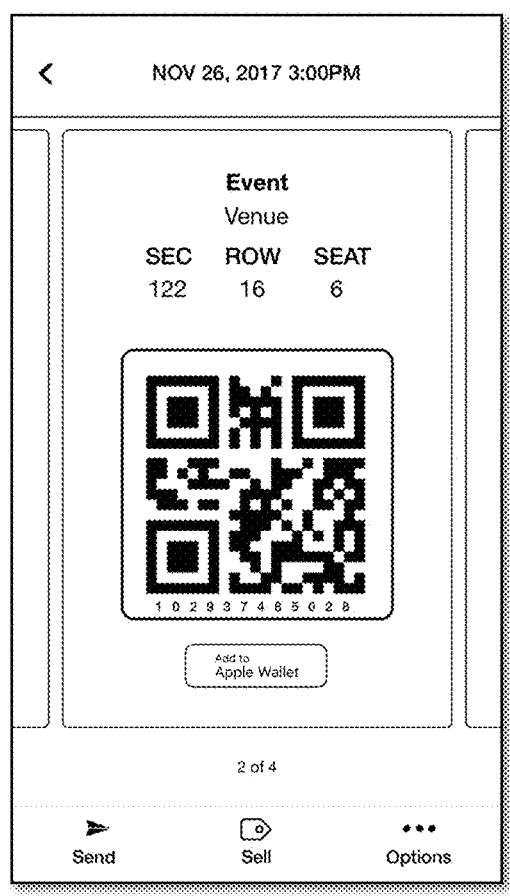

Referring to FIG. 14H, for example, tickets within a unique event group screen is shown, which may be presented in response to user selection of a unique event group thumbnail. In the present example, the user is presented with a "send" option to transfer tickets via text message or email, a "sell" option to list the tickets for sale, and an "options" option to view the original ticket (e.g., a digital photograph of a paper ticket), or delete the ticket from the unique event group. The user may also be able to add the ticket to a digital wallet.

Figure 14I:
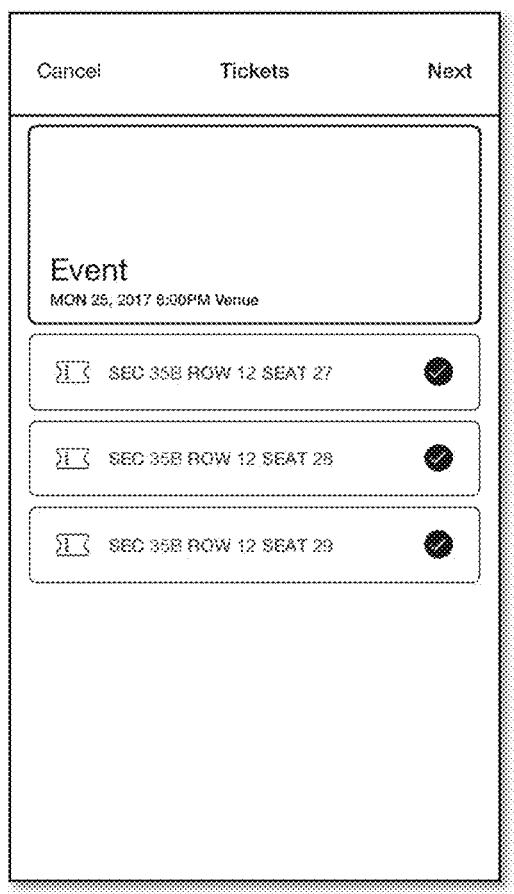

Referring to FIG. 14I, for example, a select ticket screen is shown, which may be presented in response to selection of "sell" in a unique event group. The user may select the specific tickets to initiate a sale.

Figure 14J:
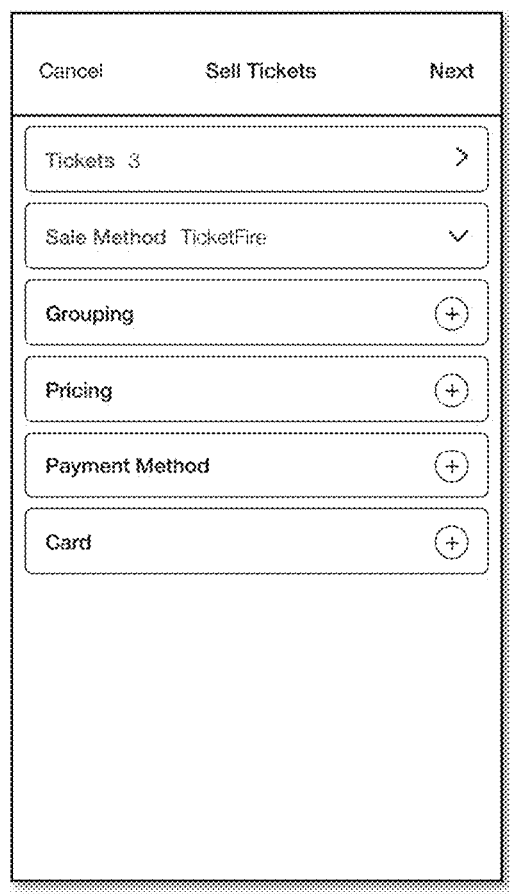

Referring to FIG. 14J, for example, an accordion list is shown, which may be presented to capture ticket information from the user on the details of the ticket sale listing. The example ticket information includes, tickets, sale method, grouping, pricing, payment method, and card.

Figure 14K:
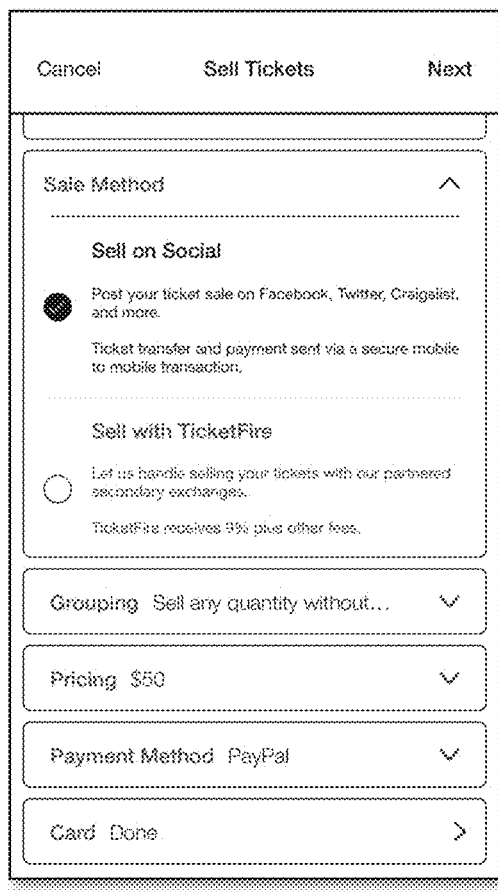

Referring to FIG. 14K, for example, the "sale method" tab includes one or more selectable options for selling the tickets confirmed as being for sale in FIG. 14I. Selecting the "sell to friends" option can cause, for example, the ticket computer system 1210 to generate and provide a URL for the ticket for distribution to the user's friends and/or other social acquaintances (e.g., followers). Selecting the "sell with TicketFire" option can cause, for example, a ticket selling service to list the tickets for sale on one or more ticket exchanges.

Figure 14L:
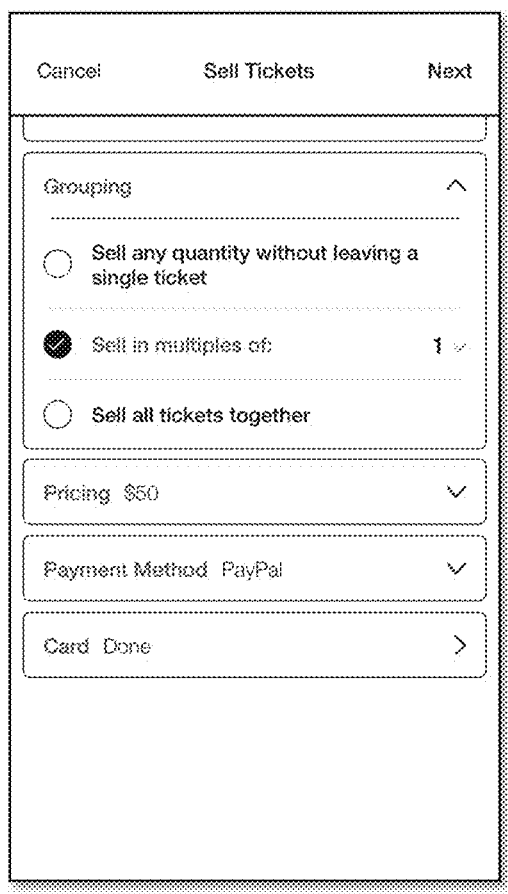

Referring to FIG. 14L, for example, a "grouping" screen is shown. In the present example, the "grouping" options include sell any quantity without leaving the user with a single ticket left, sell in multiples of a selection number, or sell all together.

Figure 14M:
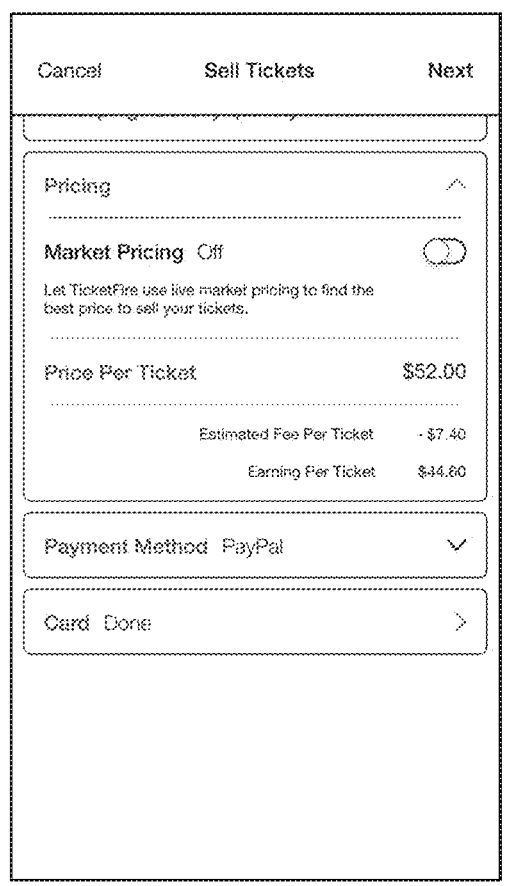

Referring to FIG. 14M, for example, a "pricing" screen is shown. The user is able to input a custom selling price, or set the tickets at market price. The server system (e.g., computer system 1210) can automatically determine the market price, a price defined at what the tickets are worth in the current secondary market, and can set the price at this point to optimize that ticket sale.

Figure 14N:
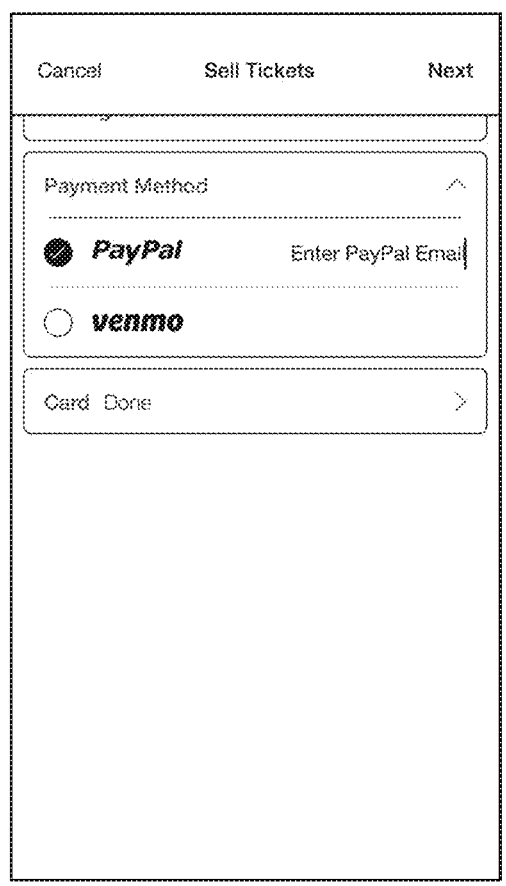

Referring to FIG. 14N, for example, a "payment method" screen is shown. In the present example, the "payment" screen includes different example options for receiving payment (e.g., VENMO, PAYPAL) that are selectable by the user for receiving payment from the sale of the selected tickets. Options to cancel (not proceed further with selling the tickets) and to confirm the payment selection are presented. FIG. 14M can be presented after selecting either (or both) of the sell options depicted in FIG. 14L.

Figure 14O:
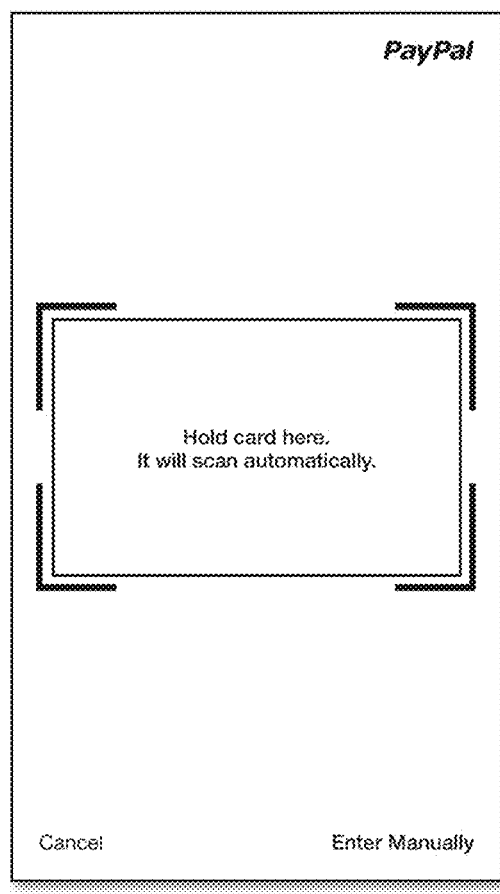

Referring to FIG. 14O, for example, a credit card capture screen is show. In the present example, this is to ensure that the server system (e.g., computer system 1210) has the ability to charge the user in case of any fraudulent activity during or after the ticket sale.

Figure 14P:
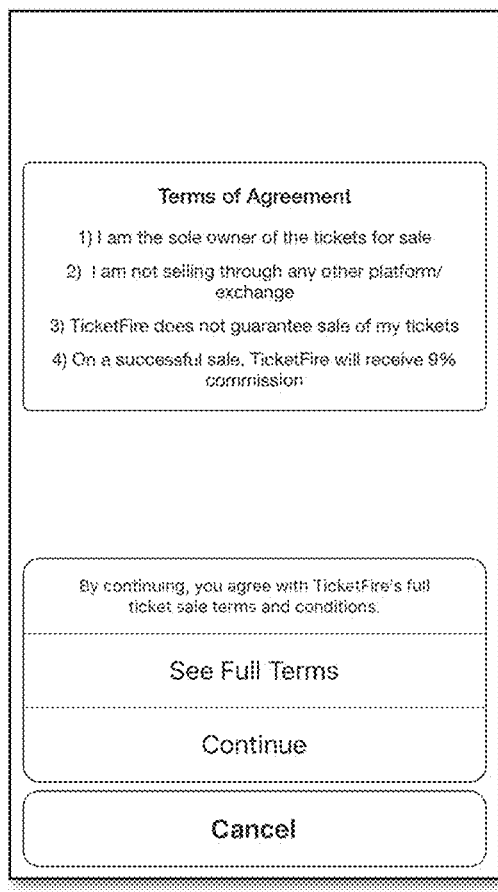

Referring to FIG. 14P, for example, a "terms of agreement" screen is shown. In the present example, the "terms of agreement" screen includes a summary of the terms of the sale of tickets through the system, including the server system's (e.g., computer system 1210) commission on the sale, and terms by which the sale will proceed (e.g., user confirmation that he/she owns the tickets, confirmation that they are not being sold on another platform, confirmation that a sale is not guaranteed, confirmation of the sale commission that will be charted for the sale). Options to cancel (not agree to the terms) and to confirm the terms of the same are presented.

Figure 14Q:
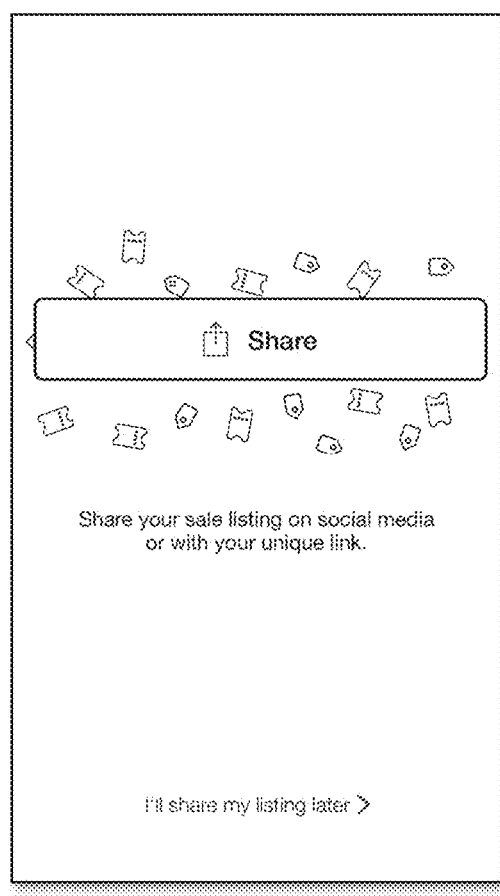

Referring to FIG. 14Q, which can be presented in response to selection of the "sell to friends" option in FIG. 14K (and following selection of the continue option in FIG. 14P), for example, a "share" screen is shown.

Figure 14R:
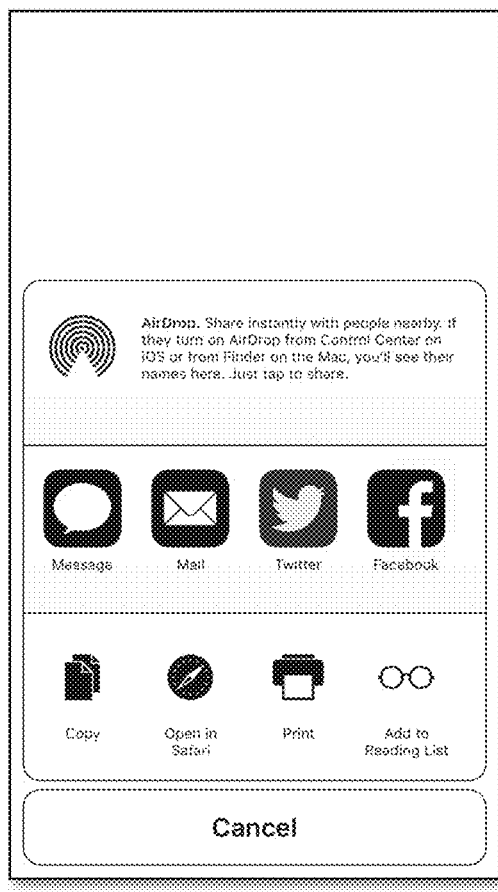

Referring to FIG. 14R, for example, the "share" screen can present a link to an electronic resource (e.g., a webpage) for selling an electronic ticket is shown, along with one or more options for distributing the link. In the present example, options for distributing the link include an option to text the link, an option to email the link, options to post the link to various social networking platforms (e.g., FACEBOOK, TWITTER), an option open the link in a web browser (preview the webpage for selling the electronic ticket), an option to share the link generally (e.g., share via a mobile device's standard/generic share options), and a done option to exit the "link sharing" screen.

Figure 14S:
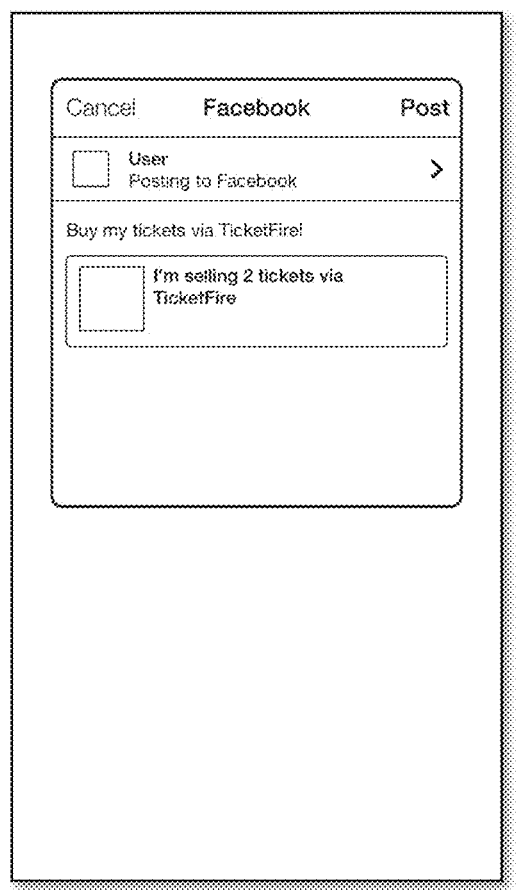

Referring to FIG. 14S, which can be presented in response to selection of the "post to FACEBOOK" option in FIG. 14R, for example, a "link posting" screen is shown. For example, selecting the "post to FACEBOOK" can cause the example post to be automatically generated as including the link for the tickets. The screen includes options to edit the automatically generated text, to add a location to the post, to designate an audience for the post, an option to submit the post (e.g., transmit post to FACEBOOK server systems), and an option to cancel (decline the post).

Figure 14T:
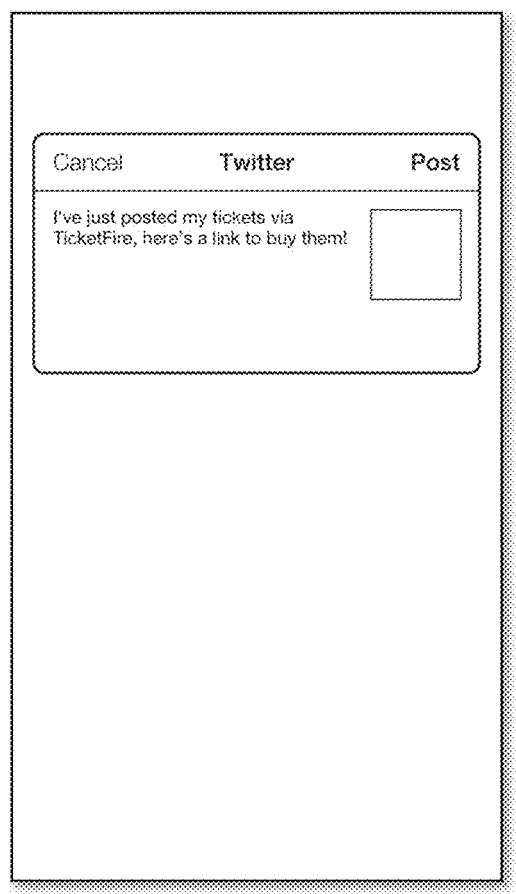

Referring to FIG. 14T, which can be presented in response to selection of the "tweet link" option in FIG. 14R, for example, a "link posting" screen is shown. For example, selecting the "tweet link" can cause the example post to be automatically generated as including the link for the tickets. The screen includes options to edit the automatically generated text, to add a location to the post, to designate an account for the post, an option to submit the post (e.g., transmit post to TWITTER server systems), and an option to cancel (decline the post).

Figure 14U:
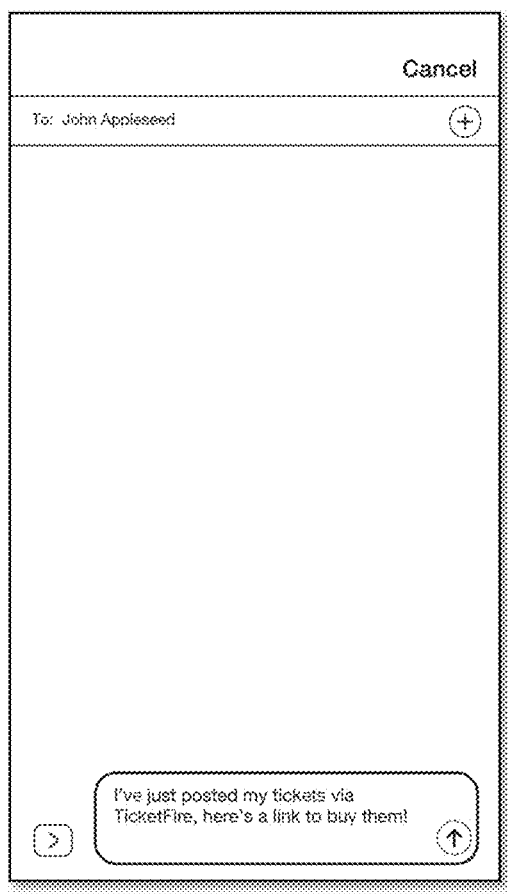

Referring to FIG. 14U, which can be presented in response to selection of the "message" option in FIG. 14R, for example, a "message" screen is shown. For example, selecting the "message" can cause the example text to be automatically generated as including the link for the tickets. The screen includes options to edit the automatically generated text, to add a recipient for the text, an option to send the text, an option to add media (e.g., photo, video) to the text, and an option to cancel (decline to send the text).

Figure 14V:
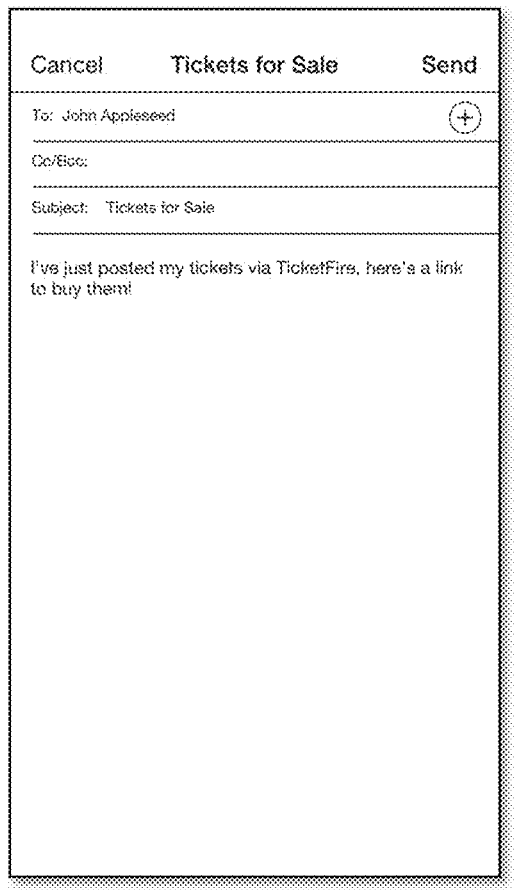

Referring to FIG. 14V, which can be presented in response to selection of the "email link" option in FIG. 14R, for example, a "link emailing" screen is shown. For example, selecting the "email link" can cause the example email to be automatically generated as including the link for the tickets. The screen includes options to edit the automatically generated text, to edit an automatically generated title for the email, to add a recipient for the email, an option to send the email, and an option to cancel (decline to send the email).

Figure 14W:
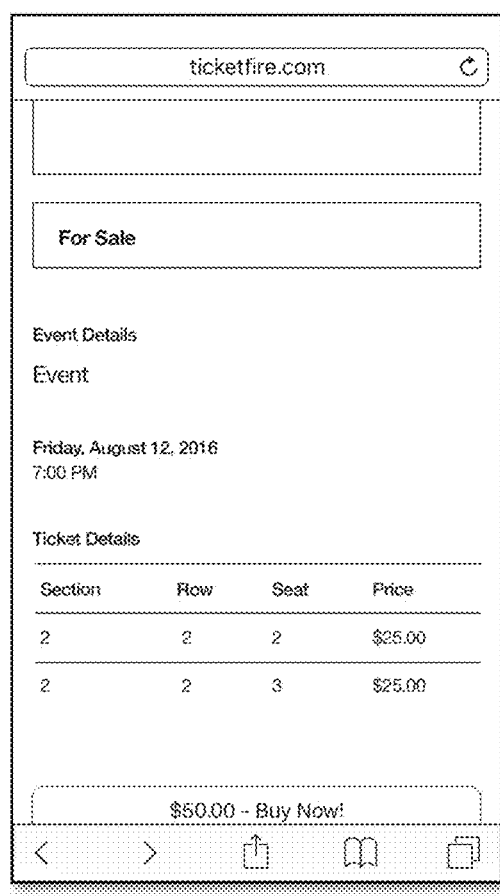

Referring to FIG. 14W, which can be presented in response to selection of the "view in web browser" option in FIG. 14R, for example, a "preview" screen is shown. For example, selecting the "view in web browser" can cause the linked-to page for the tickets to be generated. This is the same page that users who receive the link for the tickets can see, which can include event details, ticket information, information the seller, and an option to purchase the tickets directly on the site.

Figure 14X:
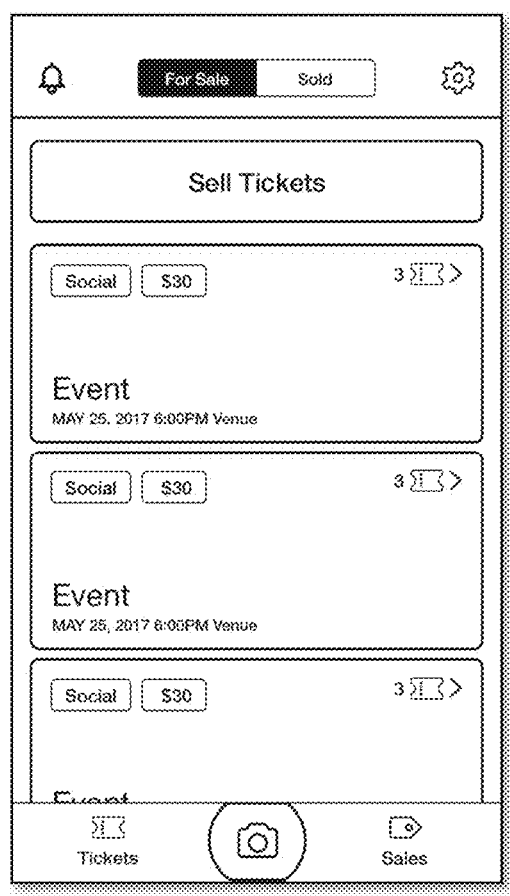

Referring to FIG. 14X, for example, a "for sale" ticket group screen is shown. "For sale" ticket groups, containing tickets that are posted for sale and have yet to be purchased or cancelled, are listed in the "for sale" screen. A user can select a ticket sale group to edit the price of the tickets or cancel the sale.

Figure 14Y:
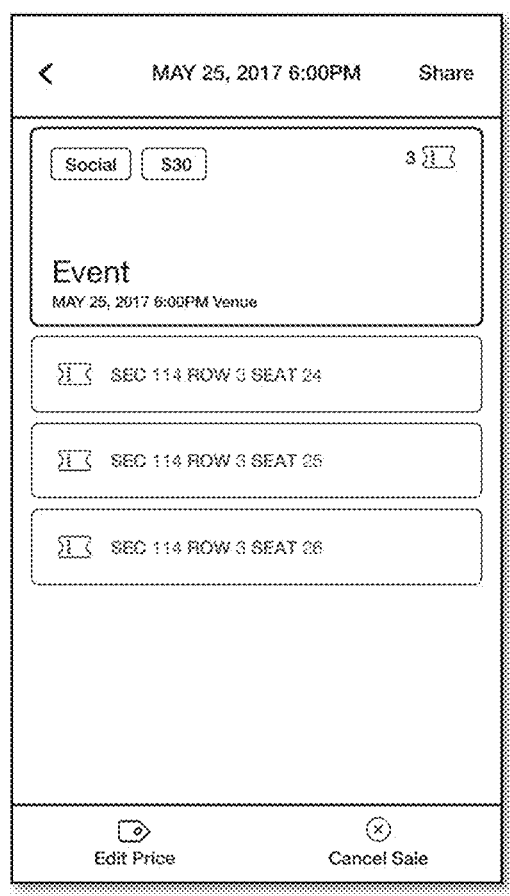

Referring to FIG. 14Y, for example, a ticket group screen is shown for a group of "for sale" tickets. The ticket sale price can be edited, and the sale can be cancelled as well.

Figure 14Z:
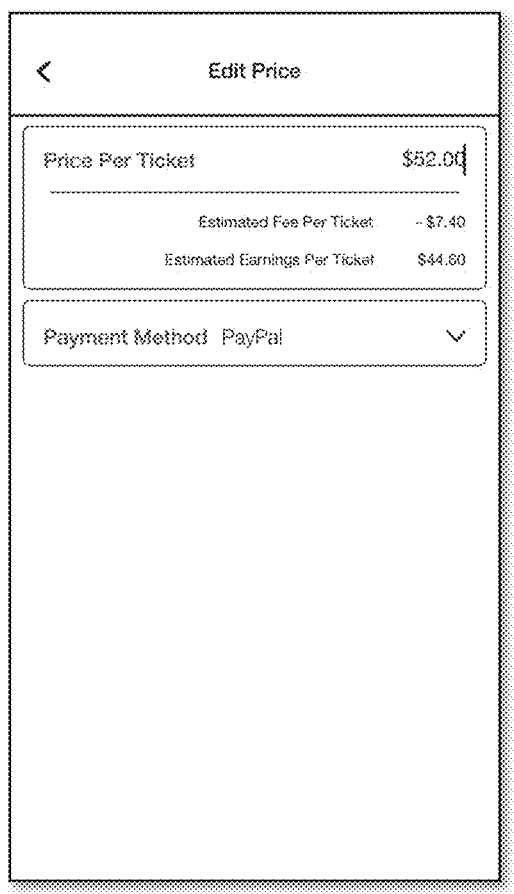
Figure 14A:
Figure 14B:

Referring to FIG. 14Z, for example, a ticket edit price screen is shown. The user can manually enter a number to change the price of the tickets. This is updated immediately on the ticket listing.

Referring to FIG. 14AA, for example, a "sold" ticket group is shown. "Sold" ticket groups, containing tickets that have been successfully sold and the tickets delivered to the buyer, are listed in the "sold" screen.

Referring to FIG. 14BB, for example, a ticket group screen is shown for a group of "sold" tickets. Specific ticket information, including date sold, price, earnings, and payment method, are all displayed.

While the disclosed technology has been illustrated and described in detail in the foregoing drawings and description, the same is to be considered as illustrative and not restrictive in character, it being understood that only illustrative embodiments thereof have been shown and described and that all changes and modifications that come within the spirit of the technology are desired to be protected. Additional features will become apparent to those skilled in the art upon consideration of the description. Modifications may be made without departing from the spirit and scope of this technology.

The invention claimed is:

1. A method of creating and distributing a digital version of a paper ticket, the method comprising: capturing, using one or more embedded digital cameras that are included as part of a first mobile computing device, a digital photo of the paper ticket, wherein the paper ticket is generated by an issuer and has already been purchased and owned by a user of the first mobile computing device, wherein the issuer of the paper ticket is different from the first mobile computing device; generating, through communication over one or more networks between the first mobile computing device and a computer system, an electronic ticket that is a digital version of the paper ticket, the electronic ticket being generated based on optical analysis of the digital photo by one or more of the first mobile computing device and the computer system, wherein the computer system is different from the issuer of the paper ticket; receiving, at the first mobile computing device and from the computer system, selectable options related to the electronic ticket, wherein the selectable options include, at least, an option to electronically transfer ownership of the paper ticket via the computer system; outputting, in a user interface on the first mobile computing device, the selectable options related to the electronic ticket; receiving, through the user interface, user input comprising selection of the option to electronically transfer ownership of the paper ticket via the computer system to another user at a second mobile computing device; transmitting, by the first mobile computing device, a request to the computer system to host the electronic ticket for ownership transfer; receiving, at the first mobile computing device and from the computer system, a unique URL that is associated with an internet-accessible resource for electronically transferring ownership of the paper ticket over an internet connection using the electronic ticket, the unique URL being specific to the electronic ticket; outputting, in the user interface on the first mobile computing device, selectable features to distribute the unique URL, directly or indirectly, to the second mobile computing device and other computing devices, the unique URL identifying a site independent of and separate from the issuer of the paper ticket, wherein ownership of the paper ticket is electronically transferred to another user at the site via the computer system; receiving, through the user interface, selection of one or more of the selectable features that correspond to one or more particular distribution channels, wherein the one or more particular distribution channels are different from the computer system and the issuer of the paper ticket; and transmitting, by the first mobile computing device, at least the unique URL along the one or more particular distribution channels, the one or more particular distribution channels electronically distributing the unique URL to the second mobile computing device and the other computing devices and, upon selection at the second mobile computing device, prompting redirection of one or more applications on the second mobile computing device to the site to electronically transfer ownership of the paper ticket, by the computer system, using the electronic ticket.

2. The method of claim 1, wherein the internet-accessible resource comprises a webpage.

3. The method of claim 1, wherein: the selectable features are associated with one or more social networking platforms, the one or more particular distribution channels comprise social media feeds that are provided by the one or more social networking platforms, the one or more social networking platforms are hosted by one or more social networking computer systems, and the one or more social networking computer systems are different from the computer system and the issuer of the paper ticket.

4. The method of claim 3, wherein transmitting at least the unique URL along the one or more particular distribution channels comprises transmitting at least the unique URL to the one or more social networking computer systems that host the one or more social networking platforms.

5. The method of claim 4, wherein at least the unique URL is transmitted as part of a social media post to the one or more social networking computer systems.

6. The method of claim 1, wherein the site to electronically transfer ownership of the paper ticket is configured to process an electronic sale of the paper ticket via online communication with one of the second mobile computing device and the other computing devices and to transfer ownership of the paper ticket upon completion of the electronic sale by transmitting the electronic ticket from the computer system to the second mobile computing device.

7. The method of claim 6, wherein the site to electronically transfer ownership of the paper ticket is different from a ticket exchange.

8. The method of claim 1, wherein the site to electronically transfer ownership of the paper ticket is configured to transfer ownership of the paper ticket without an electronic sale by transmitting the electronic ticket from the computer system to the one of the other computing devices.

9. A mobile computing device for creating and distributing a digital version of a paper ticket, the mobile computing device comprising: a digital camera to take a digital photo of the paper ticket, wherein the paper ticket is generated by an issuer and has already been purchased and owned by a user of the mobile computing device, wherein the issuer of the paper ticket is different from the mobile computing device; a network interface to communicate with a computer system to (i) generate an electronic ticket that is a digital version of the paper ticket, the electronic ticket being generated based on optical analysis of the digital photo by one or more of the mobile computing device and the computer system and (ii) obtain a unique URL that is associated with an internet-accessible resource for electronically transferring ownership of the paper ticket over an internet connection using the electronic ticket, the unique URL being specific to the electronic ticket, wherein the computer system is different from issuer of the paper ticket; a display to provide a user interface that outputs selectable options related to the electronic ticket, wherein the selectable options include, at least, (i) an option to electronically transfer ownership of the paper ticket via the computer system and (ii) selectable features to distribute the unique URL, directly or indirectly, to a remote mobile computing device and other computing devices, the unique URL identifying a site independent of and separate from the issuer of the paper ticket, wherein ownership of the paper ticket is electronically transferred to another user at the site via the computer system; and an input subsystem to receive, as part of the user interface, user input comprising (i) selection of the option to electronically transfer ownership of the paper ticket via the computer system to another user at the remote mobile computing device and (ii) selection of one or more of the selectable features that correspond to one or more particular distribution channels, wherein the one or more particular distribution channels are different from the computer system and the issuer of the paper ticket; wherein the network interface is further programmed to transmit at least the unique URL along the one or more particular distribution channels, the one or more particular distribution channels electronically distributing the unique URL to the remote mobile computing device and the other computing devices and, upon selection at the remote mobile computing device, prompting redirection of one or more applications on the remote mobile computing device to the site to electronically transfer ownership of the paper ticket, by the computer system, using the electronic ticket.

10. The computing device of claim 9, wherein the internet-accessible resource comprises a webpage.

11. The computing device of claim 9, wherein: the selectable features are associated with one or more social networking platforms, the one or more particular distribution channels comprise social media feeds that are provided by the one or more social networking platforms, the one or more social networking platforms are hosted by one or more social networking computer systems, and the one or more social networking computer systems are different from the computer system and the issuer of the paper ticket.

12. The computing device of claim 11, wherein transmitting at least the unique URL along the one or more particular distribution channels comprises transmitting at least the unique URL to the one or more social networking computer systems that host the one or more social networking platforms.

13. The computing device of claim 12, wherein at least the unique URL is transmitted as part of a social media post to the one or more social networking computer systems.

14. A computer program product tangibly embodied in a non-transitory computer readable medium that, when executed, cause a first mobile computing device to perform operations for creating and distributing a digital version of a paper ticket comprising: capturing, using one or more embedded digital cameras that are included as part of the first mobile computing device, a digital photo of the paper ticket, wherein the paper ticket is generated by an issuer and has already been purchased and owned by a user of the first mobile computing device, wherein the issuer of the paper ticket is different from the first mobile computing device; generating, through communication over one or more networks between the first mobile computing device and a computer system, an electronic ticket that is a digital version of the paper ticket, the electronic ticket being generated based on optical analysis of the digital photo by one or more of the first mobile computing device and the computer system, wherein the computer system is different from the issuer of the paper ticket; receiving, at the first mobile computing device and from the computer system, selectable options related to the electronic ticket, wherein the selectable options include, at least, an option to electronically transfer ownership of the paper ticket via the computer system; outputting, in a user interface on the first mobile computing device, the selectable options related to the electronic ticket; receiving, through the user interface, user input comprising selection of the option to electronically transfer ownership of the paper ticket via the computer system to another user at a second mobile computing device; transmitting, by the first mobile computing device, a request to the computer system to host the electronic ticket for ownership transfer; receiving, at the first mobile computing device and from the computer system, a unique URL that is associated with an internet-accessible resource for electronically transferring ownership of the paper ticket over an internet connection using the electronic ticket, the unique URL being specific to the electronic ticket; outputting, in the user interface on the first mobile computing device, selectable features to distribute the unique URL, directly or indirectly, to the second mobile computing device and other computing devices, the unique URL identifying a site independent of and separate from the issuer of the paper ticket, wherein ownership of the paper ticket is electronically transferred to another user at the site via the computer system; receiving, through the user interface, selection of one or more of the selectable features that correspond to one or more particular distribution channels, wherein the one or more particular distribution channels are different from the computer system and the issuer of the paper ticket; and transmitting, by the first mobile computing device, at least the unique URL along the one or more particular distribution channels, the one or more particular distribution channels electronically distributing the unique URL to the second mobile computing device and the other computing devices and, upon selection at the second mobile computing device, prompting redirection of one or more applications on the second mobile computing device to the site to electronically transfer ownership of the paper ticket, by the computer system, using the electronic ticket.

15. The computer program product of claim 14, wherein the internet-accessible resource comprises a webpage.

16. The computer program product of claim 14, wherein: the selectable features are associated with one or more social networking platforms, the one or more particular distribution channels comprise social media feeds that are provided by the one or more social networking platforms, the one or more social networking platforms are hosted by one or more social networking computer systems, and the one or more social networking computer systems are different from the computer system and the issuer of the paper ticket.

17. The computer program product of claim 16, wherein transmitting at least the unique URL along the one or more particular distribution channels comprises transmitting at least the unique URL to the one or more social networking computer systems that host the one or more social networking platforms.

18. The computer program product of claim 17, wherein at least the unique URL is transmitted as part of a social media post to the one or more social networking computer systems.

* * * * *